(12) United States Patent
van Houtum et al.

(10) Patent No.: US 9,929,790 B2
(45) Date of Patent: Mar. 27, 2018

(54) RECEIVER CIRCUIT

(71) Applicant: NXP B.V.

(72) Inventors: Wim van Houtum, Son en Breugel (NL); Yan Wu, Son en Bruegel (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/590,421

(22) Filed: May 9, 2017

(65) Prior Publication Data

US 2017/0331545 A1 Nov. 16, 2017

(30) Foreign Application Priority Data

May 13, 2016 (EP) ..................................... 16169552

(51) Int. Cl.
*H04B 7/12* (2006.01)
*H04B 7/08* (2006.01)
*G01S 3/06* (2006.01)
*G01S 3/26* (2006.01)
*G01S 3/36* (2006.01)
(Continued)

(52) U.S. Cl.
CPC ............... *H04B 7/086* (2013.01); *G01S 3/06* (2013.01); *G01S 3/26* (2013.01); *G01S 3/36* (2013.01); *G01S 3/46* (2013.01); *G01S 3/48* (2013.01); *H04B 7/12* (2013.01)

(58) Field of Classification Search
CPC . H04B 7/02; H04B 7/022; H04B 7/04; H04B 7/0413; H04B 7/0408; H04B 7/08; H04B 7/0842; H04B 7/0848; H04B 7/0857; H04B 7/086; H04B 7/0862; H04B 7/0865; H04B 7/12; H04B 1/10; H04B 1/1036; H04B 15/00; G01S 3/48; G01S 3/06; G01S 3/36; G01S 3/26; G01S 3/46
See application file for complete search history.

(56) References Cited

U.S. PATENT DOCUMENTS 6,018,317 A 1/2000 Dogan et al.
9,749,033 B2 * 8/2017 Chang .................... H04B 7/086
(Continued)

OTHER PUBLICATIONS

National Radio Systems Committee (NRSC)NRSC-5-C, "In-band/on-channel Digital Radio Broadcasting Standard", 53 pgs. (Sep. 2011).

(Continued)

Primary Examiner — Siu Lee
(74) Attorney, Agent, or Firm — Rajeev Madnawat

(57) ABSTRACT

A receiver system comprising: an input terminal configured to receive input signalling comprising a plurality of antenna-signals, wherein the plurality of antenna-signals each comprise information that corresponds to a first-frequency-bin and a second-frequency-bin. AoA-blocks can determine a first-angle-of-arrival and a second-angle-of-arrival associated with the first- and second-frequency-bins. A first-weighting-determination-block configured to, based on the first-angle-of-arrival and the second-angle-of-arrival, either: set first-weighting-values as values for constructively combining the information that corresponds to the first-frequency-bins of the plurality of antenna-signals; or set first-weighting-values as values for destructively combining the information that corresponds to the first-frequency-bins of the plurality of antenna-signals.

15 Claims, 6 Drawing Sheets

(51) Int. Cl.
*G01S 3/46* (2006.01)
*G01S 3/48* (2006.01)

(56) References Cited

U.S. PATENT DOCUMENTS

| | | | |
|---|---|---|---|
| 2012/0134435 A1 | 5/2012 | Kapoor et al. | |
| 2012/0212371 A1* | 8/2012 | Chang | H01Q 3/2605 342/373 |
| 2016/0142922 A1* | 5/2016 | Chen | H04B 7/0695 375/267 |

OTHER PUBLICATIONS

Van Trees, H. "Optimum Array Processing", New York: Wiley-Interscience, 12 pgs. (2002).
IBiquity Digital Corporation, "HD Radio™ Air Interface Design Description Layer 1 FM", Doc.No. SY_TN_1011s Rev. G, 133 pgs. (Aug. 23, 2011).

* cited by examiner

RECEIVER CIRCUIT

CROSS-REFERENCE TO RELATED APPLICATIONS

This application claims the priority under 35 U.S.C. § 119 of European Patent application no. 16169552.3, filed on May 13, 2016, the contents of which are incorporated by reference herein.

The present disclosure relates to receiver circuits, including receiver circuits that provide co-channel-interference-compensation (CIC).

According to a first aspect of the present disclosure there is provided a receiver system comprising:
- an input terminal configured to receive input signalling comprising a plurality of antenna-signals, each received at a different antenna, wherein the plurality of antenna-signals each comprise information that corresponds to a first-frequency-bin and a second-frequency-bin;
- a first-AoA-block configured to determine a first-angle-of-arrival associated with the first-frequency-bin;
- a second-AoA-block configured to determine a second-angle-of-arrival associated with the second-frequency-bin;
- a first-weighting-determination-block configured to, based on the first-angle-of-arrival and the second-angle-of-arrival, either:
  - set first-weighting-values as values for constructively combining the information that corresponds to the first-frequency-bins of the plurality of antenna-signals; or
  - set first-weighting-values as values for destructively combining the information that corresponds to the first-frequency-bins of the plurality of antenna-signals;
- a first-weighting-application-block configured to apply the first-weighting-values to the information that corresponds to the first-frequency-bin in the plurality of antenna-signals in order to provide a weighted-first-frequency-bin-signal;
- a second-weighting-determination-block configured to set second-weighting-values as values for constructively combining the information that corresponds to the second-frequency-bins of the plurality of antenna-signals;
- a second-weighting-application-block configured to apply the second-weighting-values to the information that corresponds to the second-frequency-bin in the plurality of antenna-signals in order to provide a weighted-second-frequency-bin-signal;
- a signal-combining-block configured to combine the weighted-first-frequency-bin-signal and the weighted-second-frequency-bin-signal in order to provide output-signalling.

In one or more embodiments the first-AoA-block comprises an outer-first-AoA-block configured to determine an outer-first-angle-of-arrival associated with an outer-subset of the first-frequency-bin. The first-weighting-determination-block may be configured to set the set first-weighting-values based on the outer-first-angle-of-arrival and the second-angle-of-arrival. The first-weighting-application-block may be configured to apply the first-weighting-values to the information that corresponds to the entire first-frequency-bin in the plurality of antenna-signals in order to provide the weighted-first-frequency-bin-signal.

In one or more embodiments the second-AoA-block comprises a middle-second-AoA-block configured to determine the second-angle-of-arrival based on a middle-subset of the second-frequency-bin. The second-weighting-application-block may be configured to apply the second-weighting-values to the information that corresponds to the entire second-frequency-bin in the plurality of antenna-signals in order to provide a weighted-second-frequency-bin-signal.

In one or more embodiments the first-weighting-determination-block is configured to set first-weighting-values based on whether or not a difference between the first-angle-of-arrival and the second-angle-of-arrival satisfies an outer-threshold-value.

In one or more embodiments the first-weighting-values comprise a plurality of first-antenna-weighting-values, one for each of the plurality of antenna-signals. The second-weighting-values may comprise a plurality of second-antenna-weighting-values, one for each of the plurality of antenna-signals.

In one or more embodiments the first-weighting-application-block is configured to: multiply each of the first-antenna-weighting-values by the information that corresponds to the first-frequency-bin of an associated one of the plurality of antenna-signals in order to provide a plurality of first-antenna-weighted-signals; and add the plurality of first-antenna-weighted-signals together in order to provide the weighted-first-frequency-bin-signal.

In one or more embodiments the second-weighting-application-block is configured to: multiply each of the second-antenna-weighting-values by the information that corresponds to the second-frequency-bin of an associated one of the plurality of antenna-signals in order to provide a plurality of second-antenna-weighted-signals; and add the plurality of second-antenna-weighted-signals together to provide the weighted-second-frequency-bin-signal.

In one or more embodiments the first-weighting-determination-block is configured to set the first-weighting-values based on the second-weighting-values for constructively combining the information that corresponds to the first-frequency-bins of the plurality of antenna-signals.

In one or more embodiments the first-weighting-determination-block is configured to: determine adjusted-second-weighting-values by modifying the second-weighting-values based on a spatial covariance matrix of the information in the plurality of antenna-signals that corresponds to the first-frequency-bin; and set the first-weighting-values as the adjusted-second-weighting-values.

In one or more embodiments the plurality of antenna-signals also each comprise information that corresponds to a third-frequency-bin. The receiver system may further comprise: a third-AoA-block configured to determine a third-angle-of-arrival associated with the third-frequency-bin; a third-weighting-determination-block configured to, based on the third-angle-of-arrival and the second-angle-of-arrival, either: set third-weighting-values as values for constructively combining the information that corresponds to the third-frequency-bins of the plurality of antenna-signals; or set third-weighting-values as values for destructively combining the information that corresponds to the third-frequency-bins of the plurality of antenna-signals; a third-weighting-application-block configured to apply the third-weighting-values to the information that corresponds to the third-frequency-bin in the plurality of antenna-signals in order to provide a weighted-third-frequency-bin-signal; and wherein the signal-combining-block is configured to combine the weighted-first-frequency-bin-signal, the weightedsecond-frequency-bin-signal and the weighted-third-frequency-bin-signal in order to provide the output-signalling.

In one or more embodiments the first-AoA-block comprises: an inner-first-AoA-block configured to determine an inner-first-angle-of-arrival associated with an inner-subset of the first-frequency-bin; an outer-first-AoA-block configured to determine an outer-first-angle-of-arrival associated with an outer-subset of the first-frequency-bin. The first-weighting-determination-block may be configured to: determine an outer-first-angle-difference-value as the difference between the outer-first-angle-of-arrival and the second-angle-of-arrival; if the outer-first-angle-difference-value is less than an outer-threshold-value, then: set first-weighting-values as values for constructively combining the information that corresponds to the first-frequency-bins of the plurality of antenna-signals; determine an inner-first-angle-difference-value as the difference between the inner-first-angle-of-arrival and the second-angle-of-arrival; if the inner-first-angle-difference-value is less than a predetermined proportion of the outer-first-angle-difference-value, then set first-weighting-values as values for constructively combining the information that corresponds to the first-frequency-bins of the plurality of antenna-signals; if the inner-first-angle-difference-value is greater than the predetermined proportion of the outer-first-angle-difference-value, then set first-weighting-values as values for destructively combining the information that corresponds to the first-frequency-bins of the plurality of antenna-signals.

In one or more embodiments the first-weighting-application-block is configured to apply the first-weighting-values to the information that corresponds to the entire first-frequency-bin in the plurality of antenna-signals in order to provide the weighted-first-frequency-bin-signal.

In one or more embodiments the second-weighting-application-block is configured to apply the second-weighting-values to the information that corresponds to the entire second-frequency-bin in the plurality of antenna-signals in order to provide a weighted-second-frequency-bin-signal.

In one or more embodiments the third-AoA-block comprises: an inner-third-AoA-block configured to determine an inner-third-angle-of-arrival associated with an inner-subset of the third-frequency-bin; an outer-third-AoA-block configured to determine an outer-third-angle-of-arrival associated with an outer-subset of the third-frequency-bin. The third-weighting-determination-block may be configured to: determine an outer-third-angle-difference-value as the difference between the outer-third-angle-of-arrival and the second-angle-of-arrival; if the outer-third-angle-difference-value is less than an outer-threshold-value, then: set third-weighting-values as values for constructively combining the information that corresponds to the third-frequency-bins of the plurality of antenna-signals; determine an inner-third-angle-difference-value as the difference between the inner-third-angle-of-arrival and the second-angle-of-arrival; if the inner-third-angle-difference-value is less than a predetermined proportion of the outer-third-angle-difference-value, then set third-weighting-values as values for constructively combining the information that corresponds to the third-frequency-bins of the plurality of antenna-signals; if the inner-third-angle-difference-value is greater than the predetermined proportion of the outer-third-angle-difference-value, then set third-weighting-values as values for destructively combining the information that corresponds to the third-frequency-bins of the plurality of antenna-signals.

In one or more embodiments the third-weighting-application-block is configured to apply the third-weighting-values to the information that corresponds to the entire third-frequency-bin in the plurality of antenna-signals in order to provide the weighted-third-frequency-bin-signal.

There may be provided a car radio receiver system comprising any receiver circuit disclosed herein, or configured to perform any method discloses herein.

There may be provided an integrated circuit or electronic device comprising any circuit or system disclosed herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

The in-band on-channel (IBOC) digital radio broadcasting standard for the FM-band is defined by the FM-part of the "In-band/on-channel Digital Radio Broadcasting Standard" document published by National Radio Systems Committee (NRSC). This document is also the basis for the transmitted IBOC-signals that can be received by an HD Radio™ certified receiver. The HD Radio™ transmissions are also based on "HD Radio™ Air Interface Design Description Layer 1 FM", Doc. No.: SY_IDD_1011sG Rev. G, Aug. 23, 2011.

Figure 1:
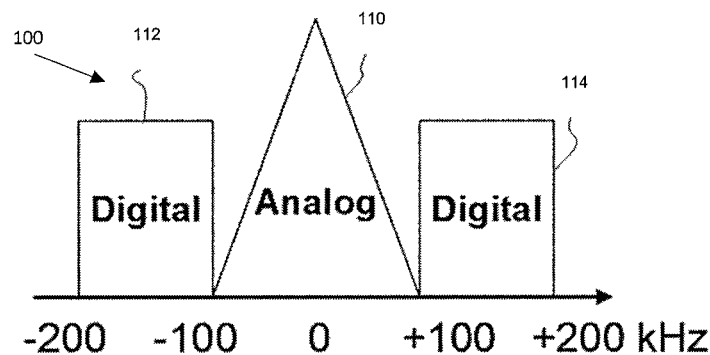
FIG. 1 shows a simplified form of one type of IBOC signal.

FIG. 1 shows a simplified form of one type of IBOC signal 100, which is the so-called "Hybrid IBOC FM" signal, and is denoted "Hybrid IBOC" in this document. Frequency is shown on the horizontal axis, with 0 Hz representing the carrier frequency. The vertical dimension of FIG. 1 represents power.

The hybrid signal 100 is a combination/addition of an analogue FM-signal 110 and a digitally-modulated signal 112, 114. The analogue FM-signal 110 occupies a bandwidth of 200 kHz, which is between −100 kHz and 100 kHz, and represents a central-part that is centred on the carrier frequency. The digitally-modulated signal 112, 114 occupies a bandwidth of roughly 200 kHz. However, the digitally-modulated signal is separated into a lower-sideband 112 and an upper-sideband 114, each with a bandwidth of roughly 100 kHz. The lower-sideband is spectrally positioned at a distance of 100 kHz below the carrier-frequency. The upper-sideband 114 is spectrally positioned at a distance of 100 kHz above the carrier-frequency. In this way, the lower-sideband 112 is below the lowest frequency of the central-part, and the upper-sideband 114 is above the highest frequency of the central-part. The digitally-modulated signal 112, 114 can use orthogonal frequency division multiplexing (OFDM), where the number of subcarriers can vary depending on the selected service/transmission-mode.

The total power of the digitally-modulated signal 112, 114 can be approximately a factor of a hundred smaller than the power of the analogue host-FM-signal 110. The hybrid IBOC signal 100 can therefore be considered as a noisy FM-signal.

A so-called "channel-grid" defines a reserved channel-bandwidth for an analogue FM-signal. The channel bandwidth in Band-II is 200 kHz by regulation, as shown by the analogue central part 110 in FIG. 1. As a consequence, the lower and upper digital OFDM-sidebands 112, 114 can correspond to the frequency range of 1st adjacent lower and upper neighbouring FM-channels. This will be described further with reference to FIGS. 2a and 2b.

Figure 2A:
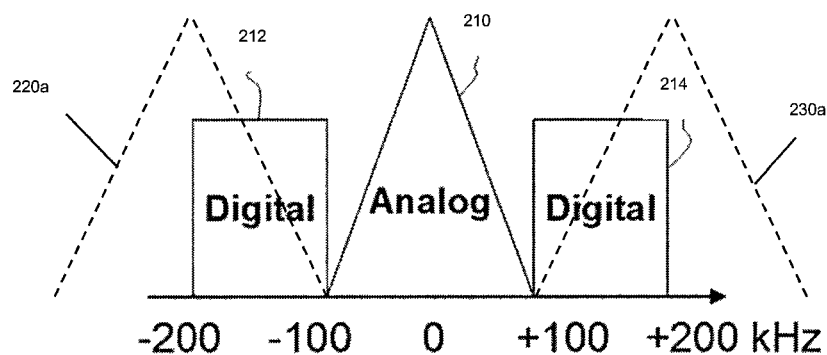
FIGS. 2a and 2b illustrates the IBOC signal of FIG. 1, along with a 1st adjacent lower and upper neighbouring FM-channels.

FIG. 2a illustrates the IBOC signal of FIG. 1, along with a 1st adjacent lower neighbouring FM-channel 220a, and a 1st adjacent upper neighbouring FM-channel 230a.

The primary sidebands 212, 214 of the (H)IBOC signal occupy roughly 100 kHz of the lower neighbouring channel 220a and roughly 100 kHz of the upper neighbouring channel 230a. Due to the fact that the primary sidebands 212, 214 are outside this 200 kHz grid, they are susceptible to interference by the neighbouring channels, that is 1st adjacent (FM)-interference. Thus, each 1st adjacent (FM)-signal 220a, 230a of a (H)IBOC-transmission can introduce co-channel interference for the digitally modulated lower- and upper-sidebands 212, 214.

The co-channel interference, by regulation, can be up to a factor of a hundred stronger in power than the digitally-modulated lower- and upper-sidebands 212, 214. Moreover, both of the 1st-adjacent interference signals 220a, 230a can be present at the same time, thus the lower- and upper-sidebands 212, 214 are in this case both distorted by a neighbouring FM-transmission.

Figure 2B:
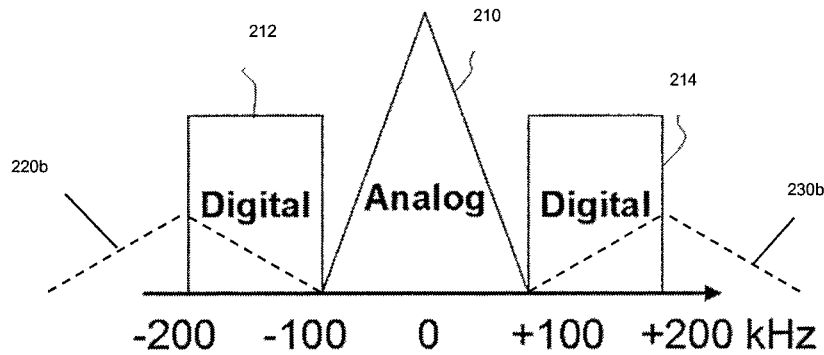

FIG. 2b illustrates an IBOC signal of FIG. 1, along with a 1st adjacent neighbouring FM-channels 220b, 230b. In contrast to FIG. 2a, the power of the 1st adjacent lower neighbouring FM-channel 220b and the 1st adjacent upper neighbouring FM-channel 230b is less than the respective digitally modulated lower- and upper-sidebands 212, 214 that they interfere with.

Figure 3:
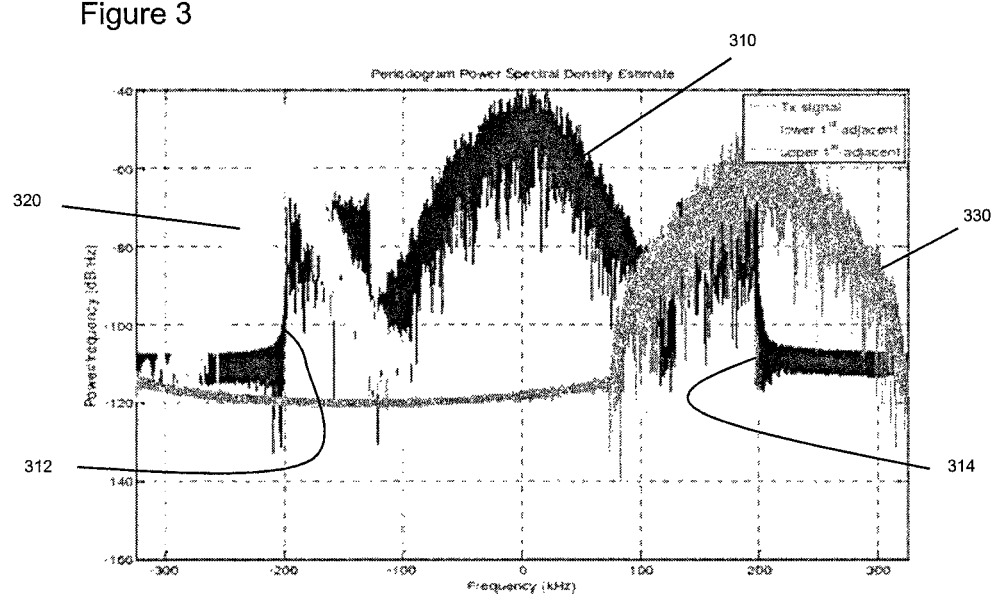
FIG. 3 shows a periodogram power spectral density (PSD) estimate of a (H)IBOC-transmission with lower and upper 1st-adjacent (FM)-interference signals.

FIG. 3 shows a periodogram power spectral density (PSD) estimate of a (H)IBOC-transmission with lower and upper 1st-adjacent (FM)-interference signals. Various portions of the signals in FIG. 3 have been given the same reference numbers as the corresponding portions of the signals shown in FIG. 2a.

FIG. 3 shows that indeed the lower- and upper-sidebands 312, 314 of the (H)IBOC transmission (black-curve) are heavily distorted by the lower 1st-adjacent neighbour FM-transmission 320 (light-grey curve) and the upper 1st-adjacent neighbour FM-transmission (dark-grey curve) 330, respectively.

"In-band on-channel" (IBOC) radio transmission systems can be used to transmit digital radio and analogue radio broadcast signals simultaneously on the same frequency. As will be discussed below, there is also an all-digital version in which two digital signals are combined. The term (H)IBOC is used in this document to refer to an IBOC signal which can be in hybrid or all-digital form.

The signal of FIG. 3 can be considered as having three non-overlapping frequency bins: a lower-frequency-bin between −300 and −100 kHz; a middle-frequency-bin between −100 and +100 kHz, and an upper-frequency-bin between +100 and +300 kHz. The lower-frequency-bin and the upper-frequency-bin are examples of first- and third-frequency-bins, which can include some interference (for example from an adjacent neighbouring FM-channel 320, 330) and a portion of a desired digital sideband signal 312, 314. The middle-frequency-bin is an example of a second-frequency-bin, which can include a desired FM signal 310 (or a digital equivalent signal, as will be discussed below).

Figure 4:
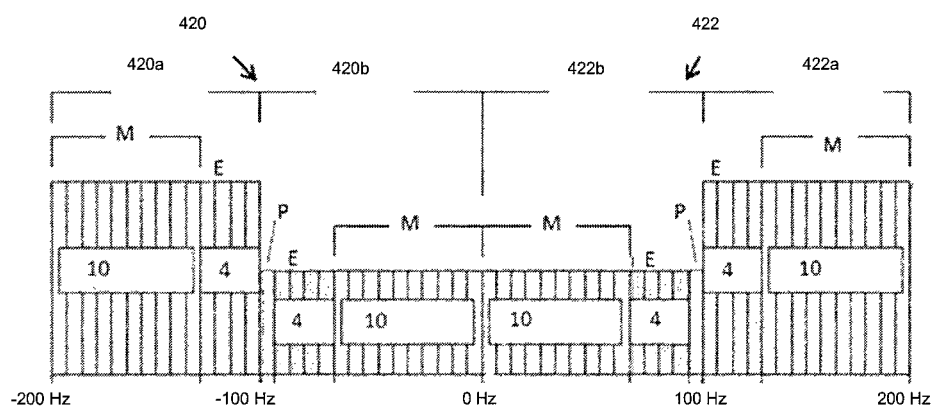
FIG. 4 shows a spectrum plot of an all-digital implementation of an IBOC signal.

FIG. 4 shows a spectrum plot of an all-digital implementation of an IBOC signal. For the all-digital IBOC FM signal, the analogue FM-signal is replaced by a (secondary) digitally-modulated signal 420b, 422b. In the all-digital mode, the bandwidth of the primary digital sidebands 420a, 422a is fully expanded with lower-power secondary sidebands.

The all-digital IBOC signal has a bandwidth of roughly 400 kHz. In the same way as described above with reference to FIG. 2a, approximately 100 kHz of each of the lower and upper adjacent channels is occupied (that is, the frequencies that are outside the 200 kHz "channel-grid"). The lower digital sideband of the all-digital IBOC signal is shown as 420 and the upper digital sideband is shown as 422. Each has a primary section 420a, 422a and a secondary section 420b, 422b. In FIG. 4, the number of extended frequency partitions (E) is fixed to 4. In a hybrid-mode system, for example as shown in FIGS. 1 and 2, the number of extended frequency partitions (E) can be; 0, 1, 2, or 4, depending on the transmitted service mode.

Figure 5:
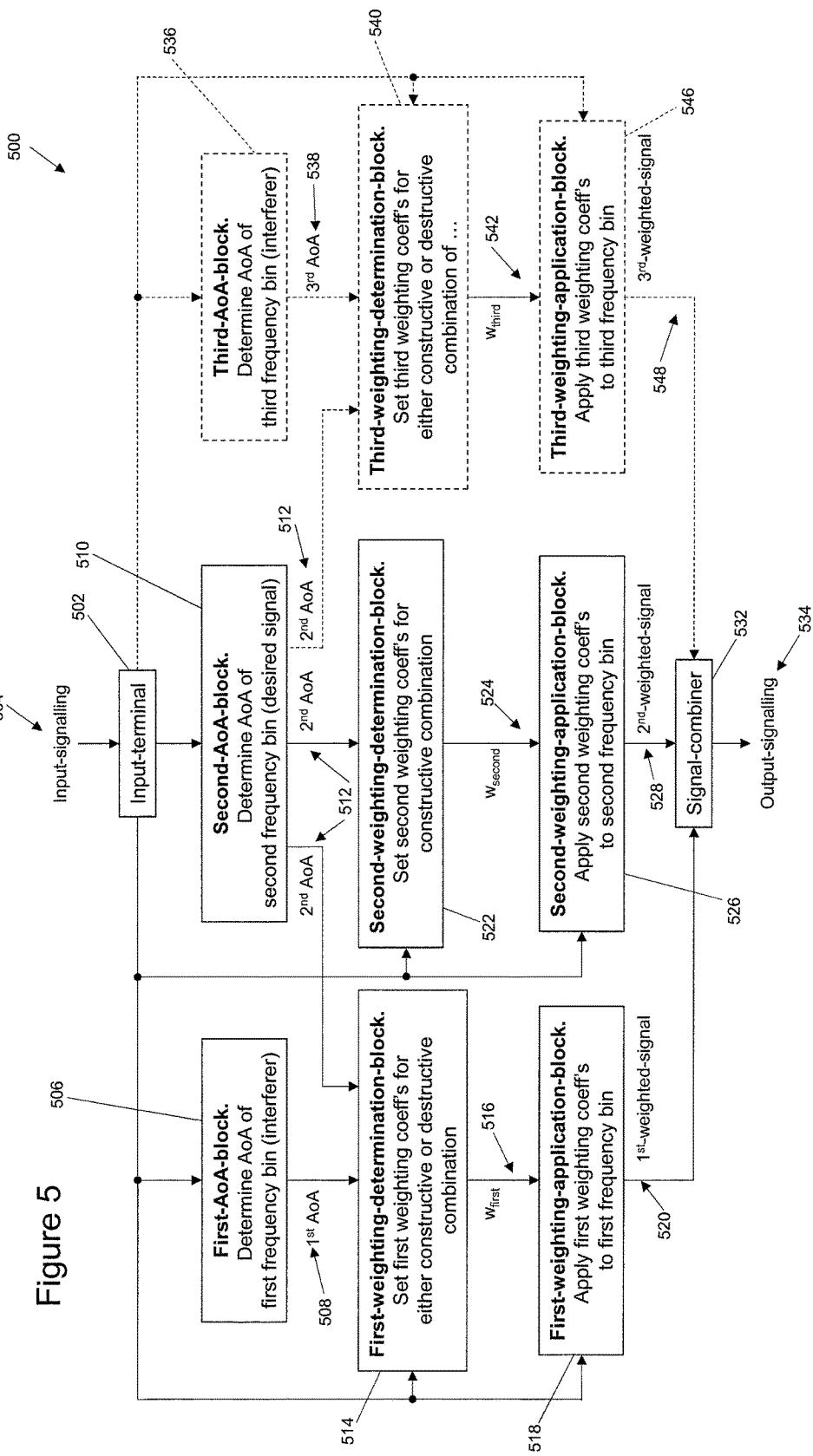
FIG. 5 shows an example embodiment of a receiver.

FIG. 5 shows an example embodiment of a receiver system 500.

The receiver system 500 includes an input terminal 502 that receives input-signalling 504. The input-signalling 504 includes a plurality of antenna-signals, each received at a different antenna. Using a plurality of antenna-signals, from a corresponding plurality of antennae, can be a convenient way of enabling an angle of arrival of a received signal to be determined. The plurality of antenna-signals each comprise information that corresponds to at least a first-frequency-bin and a second-frequency-bin. The first-frequency-bin may include a first adjacent interference signal and a digital sideband signal of a desired IBOC signal. The second-frequency-bin may include a central portion of a desired IBOC signal. As will be appreciated from the below description, the received antenna-signals can be in the time domain, whilst still comprising information that corresponds to these frequency bins.

Advantageously, the receiver system 500 can determine:
  an angle-of-arrival of signals in the first-frequency-bin that potentially includes an interference signal (such as the upper-frequency-bin (+100 to +300 kHz) or the lower-frequency-bin (−300 to −100 kHz) that are shown in FIG. 3); and
  an angle-of-arrival of signals in a second-frequency-bin that includes the central part of a desired IBOC signal (such as the middle-frequency-bin (−100 to +100 kHz) that is shown in FIG. 3).

The system 500 can then use the angles-of-arrival to determine whether or not the signals in the two frequency-bins are likely to have originated from a different source, and therefore whether or not they should be considered as interfering with each other. Based on this determination, weighting coefficients/values can be set so that the signals from the multiple antennae are combined with each other in such a way that improved output-signalling can be generated.

A first-AoA-block 506 determines a first-angle-of-arrival 508 associated with the first-frequency-bin. An example implementation of this functionality is discussed below, and can involve determining a co-variance matrix between the portions of the antenna-signals that correspond to the first-frequency-bin, that are received at the different (spaced-apart) antennae. Optionally, as will be discussed below, the first-AoA-block 506 can determine the first-angle-of-arrival 508 based on a subset of the first-frequency-bin, such as an outer-subset of the first-frequency-bin, which may be considered as a good representative of any first adjacent interference signal because it should be outside the frequency range of the digital sideband of the desired IBOC signal that is also located in the first-frequency-bin.

A second-AoA-block 510 determines a second-angle-of-arrival 512 associated with the second-frequency-bin. The second-angle-of-arrival 512 can be determined in a similar way to the first-angle-of-arrival 508. Optionally, as will be discussed below, the second-AoA-block 510 can determine the second-angle-of-arrival 512 based on a subset of the second-frequency-bin, such as a middle-subset of the second-frequency-bin that may be considered as a good representative of the desired signal because it is spaced apart from the extremities of the second-frequency-bin and therefore is less likely to include interference from a first adjacent interference signal.

A first-weighting-determination-block 514 can set first-weighting-values 516 based on the first-angle-of-arrival 508 and the second-angle-of-arrival 512. The first-weighting-determination-block 514 can either set the first-weighting-values 516 as values for constructively combining the information that corresponds to the first-frequency-bins of the plurality of antenna-signals; or can set the first-weighting-values 516 as values for destructively combining the information that corresponds to the first-frequency-bins of the plurality of antenna-signals.

For example, if a difference between the first-angle-of-arrival 508 and the second-angle-of-arrival 512 is more than a threshold value (which may be referred to as an outer-threshold-value and may take a value such as 10 degrees), then the first-weighting-values 516 are set for destructive combination on the basis that the signals in the first-frequency-bin originate from a different location and therefore are assumed to be interference signals. Such destructive combination can reduce the effect of the interference signal on the digital sideband signal that is located in the first-frequency-bin, and therefore improve the ability of the downstream processing to decode the digital sideband signal.

If the difference between the first-angle-of-arrival 508 and the second-angle-of-arrival 512 is less than the threshold value, then the first-weighting-values 516 are set for constructive combination on the basis that the signals in the first-frequency-bin originate from the same direction as those in the second-frequency-bin, and therefore the signals cannot be separated from each other due to a lack of spatial separation. Since, there is no (or sufficiently low) spatial-separation between the signals the "conventional" CIC-algorithm should be applied (as it may be the case if beamforming was not used), which operates the best/optimally if the $1^{st}$-adjacent interference-signals are strong. Thus, combining is applied to obtain the "strongest"-signal.

Further, if the AoAs are similar/identical then the $1^{st}$-adjacent interference-signal ($1^{st}$-frequency-bin) can also be a residual, i.e., leakage, of the desired signal ($2^{nd}$-frequency-bin) if no $1^{st}$-adjacent interferer is present, in which case combining is also useful to prevent "self-nulling".

As will be discussed below, an example implementation of generating the first-weighting-values 516 can also use co-variance matrices, and therefore one of the first-weighting-determination-block 514 and the first-AoA-block 506 can reuse some of the processing that is performed for the other block. In a similar way to the first-AoA-block 506, the first-weighting-determination-block 514 can set the first-weighting-values 516 based on a subset of the first-frequency-bin and a subset of the second-frequency-bin.

A first-weighting-application-block 518 applies the first-weighting-values 516 to the information that corresponds to the first-frequency-bin in the plurality of antenna-signals in order to provide a weighted-first-frequency-bin-signal 520. In this way, the parts of the plurality of antenna-signals that correspond to the first-frequency-bin are either constructively or destructively combined into a single weighted-first-frequency-bin-signal 520.

The first-weighting-application-block 518 can apply the first-weighting-values 516 to the entire frequency range of the first-frequency-bin, even if the angles of arrival 508, 512 and/or first-weighting-values 516 are calculated using subsets of frequency bins. This is why the input-signalling is shown in FIG. 5 as a direct input to the first-weighting-application-block 518.

A second-weighting-determination-block 522 sets second-weighting-values 524 as values for constructively combining the information that corresponds to the second-frequency-bins of the plurality of antenna-signals. The second-frequency-bins are assumed to correspond to a portion of the channel grid that is reserved for the signal in question. Therefore, constructively combining these signals can improve the SNR or SINR of the second-frequency-bin. Again, the second-weighting-determination-block 522 can set the second-weighting-values 524 based on a subset of the second-frequency-bin.

A second-weighting-application-block 526 applies the second-weighting-values 524 to the information that corresponds to the second-frequency-bin in the plurality of antenna-signals in order to provide a weighted-second-frequency-bin-signal 528. In this way, the parts of the plurality of antenna-signals that correspond to the second-frequency-bin are constructively combined into a single weighted-second-frequency-bin-signal 528.

The second-weighting-application-block 526 can apply the second-weighting-values 524 to the entire frequency range of the second-frequency-bin, even if the second-angle-of-arrival 512 and/or the second-weighting-values 524 are calculated using subsets of frequency bins.

The receiver system 500 also includes a signal-combining-block 532 configured to combine the weighted-first-frequency-bin-signal 520 and the weighted-second-frequency-bin-signal 528 in order to provide output-signalling 534. Such combination can retain the spacing in the frequency domain of the first- and second-frequency-bins (even if the signals that are added together are time domain signals) such that the frequency components of the weighted-first-frequency-bin-signal 520 and the weighted-second-frequency-bin-signal 528 do not overlap with each other in the output-signalling 534.

In this example, the plurality of antenna-signals also each comprise information that corresponds to a third-frequency-bin. The third-frequency-bin may be the other first adjacent interference signal; that is, the opposite one to that included in the first-frequency-bin. Therefore, if the first-frequency-bin corresponds to a frequency range of −300 to −100 kHz, then the third-frequency-bin corresponds to a frequency range of +100 to +300 kHz, and vice versa.

The receiver system 500 includes blocks for processing the third-frequency-bin that are similar to those described above with reference to the first-frequency-bin, as will be discussed below.

A third-AoA-block 536 determines a third-angle-of-arrival 538 associated with the third-frequency-bin. A third-weighting-determination-block 540 sets third-weighting-values 542 based on the third-angle-of-arrival 538 and the second-angle-of-arrival 512. As above, the third-weighting-determination-block 540 either sets the third-weighting-values 542 as values for constructively combining the information that corresponds to the third-frequency-bins of the plurality of antenna-signals; or sets the third-weighting-values as values for destructively combining the information that corresponds to the third-frequency-bins of the plurality of antenna-signals. A third-weighting-application-block 546 applies the third-weighting-values 542 to the information that corresponds to the third-frequency-bin in the plurality of antenna-signals in order to provide a weighted-third-frequency-bin-signal 548.

In such an example, the signal-combining-block 532 can combine the weighted-first-frequency-bin-signal 520, the weighted-second-frequency-bin-signal 528 and the weighted-third-frequency-bin-signal 548 in order to provide the output-signalling 534.

Figure 6:
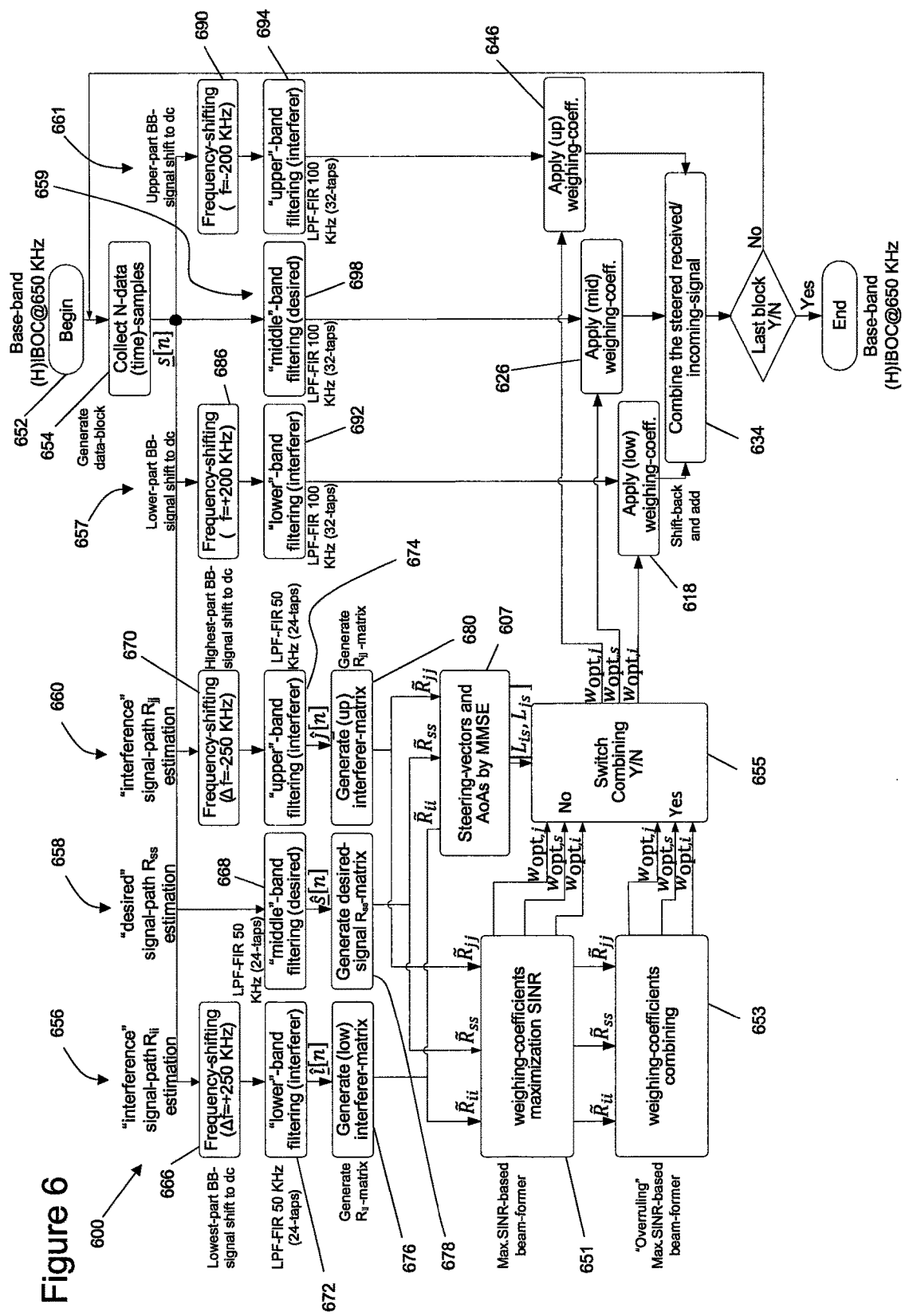
FIG. 6 shows a detailed view of a method that can be performed by a receiver system such as the one of FIG. 5.

FIG. 6 shows a detailed view of a method 600 that can be performed by a receiver system such as the one of FIG. 5. The method can be considered as providing selective beam forming with double-null-steering.

Reception improvement of transmitted (H)IBOC-signals can be obtained with electronically steered antennae radiation-patterns of a multiple(two)-antennae, e.g., an Uniform-Linear-(antennae)-Array (ULA) consisting of two isotropic antennae. To steer the radiation-pattern by using complex base-band signals with phase and amplitude-estimations can be referred to as electronically-steered complex base-band beam forming. This type of beamforming also enables "null-steering" to suppress (or remove) interference signals. For example, it can enable the suppression of 1st-adjacent (FM)-interference signals for a (H)IBOC-transmission (in the hybrid-mode as well as in the all-digital mode). Moreover, this type of beamforming enables the so called; co-channel-interference cancellation (CIC) since the 1st adjacent (FM)-interference signals are co-channel interference signals for the digitally-modulated side-bands of a (H)IBOC-transmission. However, the suppression of the 1st-adjacent interference-signals can also lead to suppression of the received desired-signal if there is not enough "spatial-separation" between the interference-signal and the desired-signal; this is called "self-nulling". This self-nulling should be avoided with an appropriate self-nulling prevention-procedure, examples of which are described below.

One or more of the examples described below can prevent (or reduce the likelihood of) self-nulling based on a steering-vector of a received-signal. The steering-vector represents the angle-of-arrival (AoA) of that received-signal. To compute the steering-vector we propose to use a portion of roughly 100 kHz wide (frequency-bin of 100 kHz) to obtain training-signals or surrogate-signals (representatives) for the desired-(H)IBOC-signal, the lower 1st-adjacent (FM)-interference-signal, and the upper 1st-adjacent (FM)-interference-signal. These surrogate-signals will then be used to compute the steering-vectors of the two 1st-adjacent interference signals as well as the desired signal. After obtaining the steering-vector we derive a one-to-one relation between the angle-of-arrival (AoA) and the steering-vector. We then propose that the AoA is used to decide about the spatial-separation of the signals. Finally, if there is a lack-of-spatial-separation we propose to apply constructive-combining of the signals. This whole procedure may be referred to as a "Prevention of self-nulling"-algorithm for (H)IBOC-transmissions.

A beam forming process has the objective to remove, or at least reduce, both the 1st-adjacent interference signals with the usage of multiple antennae, in some examples only two antennae for reasons of low complexity and costs. Note, that Maximal Ratio Combining (MRC) is not capable of removing or reducing the co-channel interference caused by the 1st-adjacent (FM)-interference signals, since MRC is only optimally combining the total signal-energy, i.e., including the 1st-adjacent signal-energy. Since, the desired (H)IBOC-signal and both of the 1st-adjacent (FM)-interference signals are originating from different locations, which is normally the case with FM-transmissions in Band-II, the inventors have found that the space-domain could be exploited by a beam forming approach to try to remove the 1st-adjacent (FM)-interference signals. Now, it is the task of an (electronically-steered complex base-band) beam forming algorithm to separate the three different signals by their spatially different information ("spatial-signature").

However, if there is a lack-of-spatial-separation it might be that the received desired signal also gets suppressed, this is known as "self-nulling", and is an undesired effect by beam forming. To prevent the self-nulling we propose, in this document, to compute the steering-vector of a received-signal. This steering-vector represents the angle-of-arrival (AoA) of that received-signal, as we will show later.

The method of FIG. 6 begins at step 652 where a time-discrete base band signal, for example, with a sample frequency of 650 kHz, may be selected and down-converted for each of a plurality of antenna-signals such that all of the information from a frequency domain/time domain of −325 kHz to +325 kHz for each signal may be captured. At step 654 a number N of data samples may be collected. Note that although the signals shown in FIGS. 1 to 4 are illustrative of a sample frequency, the N-data samples in FIG. 6 are time samples, rather than frequency samples. N may be a number that is sufficiently high such that the training signals are effectively representative of the interference and desired signals.

For example, roughly 2000 samples (in one example 1872 samples) may be used to make a training signal for a frequency of 650 kHz. A person of skill in the art will understand that the length of each sample will depend on the sample frequency for instance, in the case of 650 KHz, 1.65 micro-seconds (µs), such that 2000 samples for 650 kHz may result in, at the most, latency on the order of 3 milliseconds (ms). Note that analogue-to-digital conversion of the received signals can be performed as part of the IBOC-rendering process; thus, no additional processing other than for writing the samples may be required to render samples. This is because the samples are merely the digital representation of the received signal repeatedly processed (divided) into N time-samples. Thus, the sampling may be constant, so that new samples are continually available. Thus, step 654 may repeat many times before moving to steps in paths 656 to 664 as discussed below. As such, the most recent N-data samples may be maintained, such that older samples may be discarded as new samples are obtained. In some embodiments, rather than constantly being updated, samples may be updated with a frequency dependent on the speed of movement of the antenna array or the interference level of the desired signal.

Further, in part due to the added complexity and processing power required, a new range for the beam former may not be calculated for every updated sample that is collected—thus, the samples may be collected more frequently than the range is updated so that the samples are available as needed when it is determined that it is time that a new range be calculated. As noted above, if no samples have been collected when a range is to be calculated (e.g. when first tuning to the frequency), the latency will be on the order of the time required to collect N samples, which may be expressed as, if recalculating at time t, the samples will be taken from t−(N*length$_{sample}$), and the beam former will not continue until N samples have been collected.

Also, in one embodiment the intervals between recalculation of the beam former may depend on factors such as the speed of the receiver (e.g. assuming the receiver is located on a motorized vehicle)—in theory, if the receiver is moving quickly, in an extreme case the beam former may be re-calculated for every N+1 samples (e.g. the first calculation might be run on 0-2000 samples, the second calculation might be run on 1-2001 samples). Thus, the update rate would be the same as the sample rate, but such a scenario would require significant processing capability.

The method includes a first-estimation-path 656, a second-estimation-path 658 and a third-estimation-path 660, for determining weighting values for the first-frequency-bin, second-frequency-bin and third-frequency-bin, respectively. The method also includes three correction-paths: a first-correction-path 657, a second-correction-path 659 and a third-correction-path 661. These correction-paths are for combining the associated frequency-bins of the plurality of antenna-signals using the weighting values that are determined by the estimation-paths. As will be described below, in this example the estimation-paths process subsets of the associated frequency-bins, whereas the correction-paths combine the entire frequency-bins.

As illustrated by the first-estimation-path 656, a representative of the lower 1st adjacent interference signal, calculated from the N samples, may be obtained in the frequency-bin around −250 kHz, between −200 kHz and −300 kHz 666 for each antenna-signal. In this frequency bin there may be little interference, for example, from the lower digital sideband of the desired IBOC signal. That is, the first-estimation-path 656 may relate to processing on an outer-subset (between −200 kHz and −300 kHz) of the first-frequency-bin (between −100 kHz and −300 kHz).

In the second-estimation-path 658, a representative of the desired-signal, for example, again calculated from the N samples, may be obtained in the frequency-bin around zero Hertz (0 kHz) between −50 kHz and +50 kHz 668 for each antenna-signal. In this frequency bin there may be relatively little interference, for example, from the lower first adjacent interference signal and the upper first adjacent interference signal. That is, the second-estimation-path 658 may relate to processing on a middle-subset (between −50 kHz and +50 kHz) of the second-frequency-bin (between −100 kHz and +100 kHz).

In the third-estimation-path 660, a representative of the upper 1st adjacent interference signal, calculated from the N samples, may be obtained in the frequency-bin around +250 kHz, between +200 kHz and +300 kHz 670, where there may be little interference, for example, from the upper digital sideband of the desired IBOC signal. That is, the third-estimation-path 660 may relate to processing on an outer-subset (between +200 kHz and +300 kHz) of a third-frequency-bin (between +100 kHz and 300 kHz).

Thus, the representative of the lower 1st adjacent interference signal, and the representative of the upper 1st adjacent interference signal, may be centered at steps 666 and 670 such that the signal is shifted to the Direct Current (DC) bias. Note that, for the second-estimation-path 658, the antenna-signals do not need to be shifted to the DC bias because the second-frequency-bin is already centred on 0 Hz. Thus, second-estimation-path 658 may proceed to step 668 from step 654, or in an alternate embodiment step 668 may wait for steps 672 and 674 to run in parallel.

At steps 672, 668 and 674, each of the representatives of the frequency-shifted lower 1st adjacent interference signal, desired signal, and frequency-shifted upper 1st adjacent interference signal may be filtered using a low-pass filter (LPF) of 50 kHz around 0 Hz (e.g. from −50 kHz to 50 kHz) with a finite impulse response (FIR) of 24-taps. In one embodiment, a low-pass filter is combined with a band-pass filter to shift each signal to zero (steps 666 and 670), and to filter out half of the signal to ensure the cleanest signal possible (steps 672, 668, and 674). Thus, these three different frequency bands of 100 kHz (which are subsets of the first-, second- and third-frequency-bins) may be referred to as training signals or surrogate signals.

Steering Vector Computation

The computation of a steering-vector for a (H)IBOC reception will be introduced in this section, and is represented by the following sub-steps in FIG. 6:

generating a first-frequency-bin-matrix 676,
generating a second-frequency-bin-matrix 678,
generating a third-frequency-bin-matrix 680, and
determining steering-vectors and AoAs by minimization of the mean-square-error (MMSE) 607.

Computation of the steering-vector is based on the (sample-based) spatial-covariance matrices as described below. As will be discussed below, the weighting-values are generated based on the spatial covariance matrices by applying a "maximization of SINR criterion" algorithm, and these optimal weighting-values are applied on the $1^{st}$, $2^{nd}$ and $3^{rd}$-frequency-bins. The MMSE criterion is used for obtaining the AoAs from the spatial-covariance matrices, and the AoAs are used in the "overruling", i.e., the combining, process.

Moreover, as discussed above, each of the (sample-based) spatial-covariance matrices are obtained by using a portion of roughly 100 kHz wide (frequency-bin of 100 kHz) to obtain training-signals or surrogate-signals (representatives) for the desired-(H)IBOC-signal, the lower 1st adjacent (FM)-interference-signal, and the upper 1st adjacent (FM)-interference-signal. In the remainder of this section we will introduce and explain in detail the computation of the steering-vectors.

The surrogates of the received lower 1st-adjacent (FM)-interference-signal, the received desired-signal, and the received upper 1st-adjacent (FM)-interference signal are processed by the so called; "Prevention of self-nulling" algorithm. This prevention of self-nulling algorithm calculates complex-numbers that represent estimates of the steering-vectors of the received lower and upper 1st-adjacent interference-signals as well as of the received desired-signal. As we will show later, the steering-vector of each of the received signals has a one-to-one relation with their angle-of-arrival (AoA). Therefore, the steering-vector contains the necessary spatial-information to compare the signals in the spatial-domain. Moreover, we will address these comparison criteria below under the heading "Angle-of-Arrival (AoA) comparison". As we will show, the computation of the steering-vectors can be very quick by solving an Eigen-value problem with the help of the "principal-component-analysis" (pca)-method, the so called; "estimation-and-plug" techniques. In our case, the statistical pca-method uses as an orthogonal transformation the solutions of an Eigen-value problem. By solving this Eigen-value problem, a set of observations of possibly correlated variables, i.e., the observations for our spatial-covariance matrix, are transformed into a set of values of linearly uncorrelated (orthogonal) variables called the principal components. In our case these principal components are the Eigen-vectors of the spatial-covariance matrix, i.e., a Singular-Value-Decomposition (SVD) of the spatial-covariance matrix. Moreover, with the pca-method the Eigen-vector with the largest Eigen-value is the first principal-component. We will show later on that this principal-component is proportional to the required steering-vector. In addition, the specific version of the pca-method, i.e., the SVD of a (2-by-2) spatial-covariance matrix, that is used in this example can be applied very quickly (which may be considered as instantaneous). Consequently, the proposed complex base-band "prevention of self-nulling" algorithm is fast, i.e., it has a low-latency. Actually, the latency is only determined by the observations (samples) required to compute the spatial-covariance matrix. Note, that for the determination of the weighting-values, as discussed above, we already compute a 2-by-2 co-variance matrix for the two-antennae received desired-signal vector $\underline{s}$ and also apply the pca-method as described above to compute the optimal beam-forming weighting-values. We describe below a similar procedure to obtain a steering-vector, which is then applied to prevent self-nulling.

The computation-criterion for the steering-vector in the prevention of self-nulling algorithm is the minimization of the mean-square-error (MMSE), i.e., the known Wiener-Hopf criterion. The solution of the Wiener-Hopf criterion can provide the steering-vector under some assumptions, which we will introduce later on in this section. The Wiener-Hopf MMSE-criterion takes the first partial-derivative of the mean-square-error (MSE) with respect to its weight-vector, i.e., the gradient of the MSE, set the result of this derivation to zero and solves the equation. We will show, as an example, in the remainder of this section this procedure, i.e., the Wiener-Hopf criterion, to compute the steering-vector of the transmitted desired-signal x.

The multi(two)-antennae received desired-signal is given by;

$$\underline{s} = \underline{x} + \underline{\eta} = \underline{a}x + \underline{\eta} \quad \text{Eq. 1}$$

With $\underline{\eta}$ the multi(two)-antennae (dimensional) zero-mean complex white Gaussian noise-signal vector with noise-variance $\sigma_\eta^2$ for each vector-component. Further, we assume that the received desired-signal $\underline{s}$ is a "point-source signal" with a steering-vector $\underline{a}$. Now, by applying a weighing-vector $\underline{w}$ on the received desired-signal $\underline{s}$ we might obtain an (noisy) estimate of the transmitted desired-signal x, given by;

$$\hat{x} = \underline{w}^H \underline{s} = (\underline{w}^H \underline{a})x + \underline{w}^H \underline{\eta} \quad \text{Eq. 2}$$

where $(\bullet)^H$ is the Hermitian transpose, i.e., apply both the complex-conjugate $(\bullet)^*$ and the transpose $(\bullet)^T$ operation. We now define the MSE of the estimation of the transmitted desired-signal $\hat{x}$ by;

$$MSE \triangleq \varepsilon(\underline{w}) = E\{(x-\hat{x})(x^*-\hat{x}^*)\} \triangleq E\{(x-\underline{w}^H\underline{s})(x^*-\underline{s}^H\underline{w})\} \quad \text{Eq. 3}$$

Where $E\{\bullet\}$ means statistical average. Further evaluation of Eq. 3 yields;

$$\varepsilon(\underline{w}) = E\{|x|^2\} - \underline{w}^H E\{\underline{s}x^*\} - E\{\underline{s}^H x\}\underline{w} + \underline{w}^H E\{\underline{s}\underline{s}^H\}\underline{w}$$
$$\triangleq \sigma_x^2 - \underline{w}^H \underline{v}_{\underline{s}x^*} - \underline{v}_{\underline{s}x^*}^H \underline{w} + \underline{w}^H \tilde{R}_{ss}\underline{w} \quad \text{Eq. 4}$$

with $\sigma_x^2$ is the variance of the transmitted-signal x, $\underline{v}_{\underline{s}x^*} = E\{\underline{s}x^*\}$ is the spatial cross-correlation vector, and $\tilde{R}_{ss} = E\{\underline{s}\underline{s}^H\}$ is the spatial-covariance matrix.

Recall that the Wiener-Hopf criterion computes the gradient of the MSE and sets the result to zero. Hence, the gradient of the MSE, given by Eq. 4, with respect to $\underline{w}^H$ becomes;

$$\nabla\varepsilon_{\underline{w}^H} \stackrel{def}{=} \frac{\partial\varepsilon(\underline{w})}{\partial \underline{w}^H} = -\underline{v}_{\underline{s}x^*} + \tilde{R}_{ss}\underline{w} \quad \text{Eq. 5}$$

and by setting the gradient to zero $$\nabla\varepsilon_{\underline{w}^H} = -\underline{v}_{\underline{s}x^*} + \tilde{R}_{ss}\underline{w} = \underline{0} \stackrel{yields}{\longrightarrow} \tilde{R}_{ss}\underline{w}_{opt} = \underline{v}_{\underline{s}x^*} \quad \text{Eq. 6}$$

gives, indeed, the well-known Wiener-Hopf solution.

By the previously made assumption that the received desired-signal $\underline{s}$ is a noisy point-source signal with steering-vector $\underline{a}$, i.e., $\underline{s} = \underline{a}x + \underline{\eta}$, we can rewrite the spatial cross-correlation vector as;

$$\underline{v}_{\underline{s}x^*} = E\{\underline{s}x^*\} = E\{(\underline{a}x+\underline{\eta})x^*\} = \sigma_x^2 \cdot \underline{a} \quad \text{Eq. 7}$$

which is a "scaled-version" (with the variance of the transmitted desired-signal x) of the steering-vector $\underline{a}$. Combining it with Eq. 6 gives;

$$\tilde{R}_{ss}\underline{w}_{opt} = \sigma_x^2 \cdot \underline{a} \triangleq \lambda \underline{w}_{opt} \quad \text{Eq. 8}$$

This turns out to be what we, actually, need to solve an Eigen-value problem. The solution of this Eigen-value problem provides the optimal weight-vector. Moreover, this optimal weight-vector represents the steering-vector of the transmitted desired-signal x and might, therefore, be given by;

$$\underline{w}_{opt} = P\{\tilde{R}_{ss}\} \propto \underline{a} \quad \text{Eq. 9}$$

Where $P\{\bullet\}$ is the operator that returns the principal Eigen-vector of a matrix based on the pca, which is proportional to the steering-vector $\underline{a}$.

With a two antennae Uniform-Linear-Array (ULA) the spatial-covariance matrix $R_{ss}$ is a 2-by-2 matrix where the characteristic-function to compute the Eigen-vectors of the desired received-signal $\underline{s}$ is only a "straight-forward" quadratic-function that needs to be solved. This quadratic-function is given by;

$$\lambda^2 - tr\{A\}\lambda + \det\{A\} = 0 \Rightarrow \lambda_{1,2} = \frac{tr\{A\} \pm \sqrt{tr^2\{A\} - 4\cdot\det\{A\}}}{2} \quad \text{Eq. 10}$$

where $A \triangleq \tilde{R}_{ss}$, $tr\{A\}$ is the trace of matrix A, and $\det\{A\}$ is the determinant of matrix A.

Now the first (largest) principal Eigen-vector $\underline{w}_{opt}$ representing the steering-vector $\underline{a}$ can be found, according to the Cayley-Hamilton theorem, by exploiting the columns of the solution-matrix $(A - \lambda_2 I)$, where $\lambda_2$ is the smallest Eigen-value out of the quadratic-function of Eq. 10. Working-out this procedure shows indeed that the principal Eigen-vector $\underline{w}_{opt}$ is proportional to the steering-vector $\underline{a}$ of the received desired-signal. The obtained solution $\underline{w}_{opt}$ of the Eigen-value problem will be used to compute the AoA of the received desired-signal $\underline{s}$. In addition, similar results can be derived in a similar-way for the received lower 1st adjacent (FM)-interference-signal with spatial-covariance matrix $\tilde{R}_{ii}$ and the received upper 1st adjacent (FM)-interference-signal with spatial-covariance matrix $\tilde{R}_{jj}$.

It is recalled that the processing for obtaining these spatial-covariance matrices is based on the earlier mentioned surrogate-signals (i.e. subsets of the associated frequency-bins).

Finally, for practical considerations, an approximation of the spatial-covariance matrix is used. For this approximation, the infinity-length statistical average operator $E\{\bullet\}$ will be replaced by a finite running-length sum-average, which yields a sample-based spatial-covariance matrix and is given by;

$$R_{ii} \triangleq \frac{1}{N}\sum_{n=1}^{N}(\hat{i}[n]\cdot\hat{i}^{H}[n]) \approx \tilde{R}_{ii} \quad \text{for the lower interference,}$$

$$R_{ss} \triangleq \frac{1}{N}\sum_{n=1}^{N}(\hat{s}[n]\cdot\hat{s}^{H}[n]) \approx \tilde{R}_{ss} \quad \text{for the desired signal,}$$

$$R_{jj} \triangleq \frac{1}{N}\sum_{n=1}^{N}(\hat{j}[n]\cdot\hat{j}^{H}[n]) \approx \tilde{R}_{jj} \quad \text{for the upper interference,}$$

Eq. 11 where $\hat{i}[n]$ is the stream of sample-vectors for the surrogate of the received lower 1st adjacent (FM)-interference-signal, $\hat{s}[n]$ is the stream of sample-vectors for the surrogate of the received desired-signal, and $\hat{j}[n]$ is the stream of sample-vectors for the surrogate of the received upper 1st adjacent (FM)-interference-signal and are provided as outputs of steps 672, 668, 674 shown in FIG. 6.

These sample-based spatial-covariance matrices $\tilde{R}_{ii}$, $\tilde{R}_{ss}$, $\tilde{R}_{jj}$ are provided as outputs of steps 676, 678, 680 shown in FIG. 6, and are used both for calculating angles-of-arrivals and also for calculating the weighting-values.

Now, the first- second- and third-weighting-values, which represent the steering-vectors computed by the sample-based spatial-covariance matrices can then be written as;

$$\underline{w}_{opt,i}=P\{R_{ii}\}\triangleq \underline{sv}_i \text{ for the lower interference,}$$

$$\underline{w}_{opt,s}=P\{R_{ss}\}\triangleq \underline{sv}_s \text{ for the desired signal,}$$

$$\underline{w}_{opt,j}=P\{R_{jj}\}\triangleq \underline{sv}_j \text{ for the upper interference,} \quad \text{Eq. 12}$$

where the Eigen-vectors are computed by solving the quadratic characteristic-functions for each of the three surrogate signals in the three different frequency-bins. As a result we obtain the three steering-vectors, $\{\underline{sv}_i, \underline{sv}_s, \underline{sv}_j\}$, which we use to compute the angle-of-arrivals (AoAs) of the received interference-signals as well as the received desired-signal. These AoAs are then compared to decide if there is lack-of-spatial-separation. This AoA comparison procedure will be described in the next section.

Angle-of-Arrival (AoA) Comparison

In this section we will introduce a comparison criteria to prevent self-nulling. This prevention of self-nulling decision algorithm is based on the availability of steering-vectors, which are, for example, computed as explained above under the heading "Steering-vector computation". The decision-criteria are, actually, rather "straightforward" and make use of angle-of-arrival (AoA) information that is obtained from the steering-vectors. More specifically, a decision is based on the difference between the AoAs of the received desired-signal and the received lower 1st-adjacent interference-signal and also on the difference between the AoAs of the received desired-signal and the received upper 1st-adjacent interference-signal. In the remainder of this section we will explain the comparison and the according decision-criteria.

Assuming that the received desired-signal is a single point-source RF-signal s(t) with a plane-wave propagation, then the received desired RF-signal at a two-element ULA is given by;

$$s(t) = \underline{x}(t) + \underline{\eta}(t) \triangleq e^{j(2\pi f_c t + \theta_0)}\left(\begin{bmatrix}1 \\ e^{j2\pi\frac{d\sin\varphi_x}{\lambda}}\end{bmatrix}e^{-j\frac{1}{2}2\pi\frac{d\sin\varphi_x}{\lambda}}x + \underline{\eta}'\right) \triangleq$$

$$e^{j(2\pi f_c t + \theta)}\left(\begin{bmatrix}1 \\ e^{j2\pi\frac{d\sin\varphi_x}{\lambda}}\end{bmatrix}x + \underline{\eta}\right) = e^{j(2\pi f_c t + \theta)}\underline{s}$$

Eq. 13 with $f_c$ the RF-carrier frequency (e.g., FM-band $88 < f_c < 108$ MHz) with initial-phase $\theta_0$, $$\lambda = \frac{f_c}{c}$$

the wave-length with c the speed-of-light, d the distance between two antenna-elements of the ULA $$\left(\text{e.g., } d = \frac{\lambda}{2'}\right),$$

$\underline{x}(t)$ the RF-desired-signal, $\underline{\eta}(t)$ the RF-noise-signal, and $\varphi_x$ the AoA of the transmitted desired-signal x. Now, evaluation of $\underline{s}(t)$ as the complex baseband-signal $\underline{s}$, with $$d = \frac{\lambda}{2},$$

and combining with Eq. 1, yields for the steering-vector;

$$\underline{a} = \begin{bmatrix}1 \\ e^{j\pi\sin\varphi_x}\end{bmatrix} \stackrel{def}{=} \begin{bmatrix}a_0 \\ a_1\end{bmatrix} \quad \text{Eq. 14}$$

The AoA of the transmitted desired-signal can now be obtained from the steering-vector components, assuming that the steering-vector (or an estimate) is available, this yields;

$$\varphi_x = \sin^{-1}\left(\frac{\Im\{\ln(a_1)\}}{\pi}\right) \quad \text{Eq. 15}$$

Where $\ln(\bullet)$ represents taking the natural logarithm, $\Im\{\bullet\}$ represents taking the imaginary-part of a complex-number, and $\sin^{-1}(\bullet)$ is the arcsine.

In another embodiment, a representative of the AoA might be determined by taking the natural logarithm and the imaginary-part of the complex number $a_1$. That is, without calculating the arcsine as is shown in equation 15.

Through Eq. 15, we have a direct relation between the AoA of the transmitted desired-signal $\varphi_x$ and the steering-vector $\underline{a}$. Note, the AoA is (only) calculated from the spatial-covariance matrices, which are already available from steps 676, 678, 680, and are also used to obtain the first-second- and third-weighting values (which may also be referred to as beam-forming weights) by the "maximization of the SINR" criterion described below. Thus, the AoA-computation might be a rather "complexity-friendly" extension of a beam-forming algorithm that is used to determine the beam-forming weights. Moreover, advantageously the AoAs are "consistent" with the computed beam-forming weights, and so "matching decision-criteria" are introduced with the proposed method.

Calculation of Weighting-Values

The following description relates to an implementation of how the maximization of SINR criterion in block 651 can determine the weighting-values (which may also be known as weighting-coefficients or beam-forming weights). Note that these are the beam-forming weights that are used for the three frequency-bins if no "overruling" occurs.

The generation of weighting coefficients by complex digital base-band beam-forming with double-null steering by maximizing the SINR may be as follows. Note the estimation-criterion is the maximization of the SINR, which computes the optimal weights by taking the first derivative of the Signal-to-Interference+Noise-Ratio (SINR); the result of this derivative may be set to zero which may solve the equation. The SINR may be expressed as $$SINR \stackrel{def}{=} \frac{\underline{w}^H R_{ss} \underline{w}}{\underline{w}^H R_{in} \underline{w}} \quad \text{(equation 16)}$$

where $\underline{w}$ are the weights, $(\bullet)^H$ is the Hermitian transpose, i.e., both the complex-conjugate and the transpose operation, and $$R_{ss} \stackrel{\Delta}{=} \frac{1}{N} \sum_{n=1}^{N} (\underline{s}[n] \cdot \underline{s}^H[n]), \quad \text{(eq. 17)}$$

$$R_{in} \stackrel{\Delta}{=} \frac{1}{N} \sum_{n=1}^{N} (\{\underline{i}[n] + \underline{n}[n]\} \cdot \{\underline{i}[n] + \underline{n}[n]\}^H)$$

are the sample co-variance matrices (an approximation of the co-variance matrices over a finite number of samples N), and $\underline{n}[n]$ represents complex-Gaussian noise vector with zero-mean and variance $\sigma^2 = N_0$ for each of the components. In an example case the sample co-variance matrix $R_{in}$ may not be available, however, for an IBOC transmission the representative signals may be used to obtain an approximation of the sample co-variance matrix $R_{in}$ (and also for the sample co-variance matrix $R_{jn}$), yielding:

$$R_{in} \approx R_{ii} \stackrel{\Delta}{=} \frac{1}{N} \sum_{n=1}^{N} (\hat{\underline{i}}[n] \cdot \hat{\underline{i}}^H[n]) \quad \text{lower interference} \quad \text{(eq. 18)}$$

$$R_{ss} \approx R_{\hat{s}\hat{s}} \stackrel{\Delta}{=} \frac{1}{N} \sum_{n=1}^{N} (\hat{\underline{s}}[n] \cdot \hat{\underline{s}}^H[n]) \quad \text{desired signal}$$

$$R_{jn} \approx R_{jj} \stackrel{\Delta}{=} \frac{1}{N} \sum_{n=1}^{N} (\hat{\underline{j}}[n] \cdot \hat{\underline{j}}^H[n]) \quad \text{upper interference}$$

where $\hat{\underline{i}}[n]$ is the stream of samples for the surrogate of the lower 1st adjacent interference signal, $\hat{\underline{s}}[n]$ is the stream of samples for the surrogate of the desired signal, and $\hat{\underline{j}}[n]$ is the stream of samples for the surrogate of the upper 1st adjacent interference signal.

An IBOC transmission with two $1^{st}$ adjacent interference signals (and, in some embodiments, complex-Gaussian noise) may be expressed as a summation of three spatial different and independent signals, i.e., the lower $1^{st}$ adjacent interference signal, the desired signal, and the upper $1^{st}$ adjacent interference signal with independent complex-Gaussian noise. Thus, the SINR may be expressed as $$SINR_{HIBOC} \stackrel{def}{=} \quad \text{(eq. 19)}$$

$$E\left\{\frac{\underline{w}^H R_{ss} \underline{w}}{\underline{w}^H R_{inj} \underline{w}}\right\} \approx \frac{1}{3}\left(\frac{\underline{w}_i^H R_{ss} \underline{w}_i}{\underline{w}_i^H R_{ii} \underline{w}_i} + \frac{\underline{w}_s^H R_{ss} \underline{w}_s}{\underline{w}_s^H R_{nn} \underline{w}_s} + \frac{\underline{w}_j^H R_{ss} \underline{w}_j}{\underline{w}_j^H R_{jj} \underline{w}_j}\right)$$

where $E\{\bullet\}$ is an expression of the statistical average. The optimum weighing-coefficients, i.e., the weight-vector may be obtained by maximizing the SINR, $$\underline{w}_{opt} \stackrel{def}{=} \underset{\underline{w}}{\operatorname{argmax}} \{SINR\} = \underset{w}{\operatorname{argmax}}\left\{\frac{\underline{w}^H R_{ss} \underline{w}}{\underline{w}^H R_{ss} \underline{w}}\right\}. \quad \text{(eq. 20)}$$

For a received IBOC transmission, such as the transmission 100 shown in FIG. 1, the interference-signals 220a, 230a and the desired signal 210 shown in FIGS. 2a and 2b may be separated into different frequency-bins, so that for each frequency-bin the SINR will be optimized to obtain the weights, such that $$\underline{w}_{opt,i} \stackrel{def}{=} \underset{\underline{w}_i}{\operatorname{argmax}}\left\{\frac{\underline{w}_i^H R_{ss} \underline{w}_i}{\underline{w}_i^H R_{ii} \underline{w}_i}\right\} \quad \text{lower interference} \quad \text{(eq. 21)}$$

$$\underline{w}_{opt,s} \stackrel{def}{=} \underset{\underline{w}_s}{\operatorname{argmax}}\left\{\frac{\underline{w}_s^H R_{ss} \underline{w}_s}{\underline{w}_s^H R_{nn} \underline{w}_s}\right\} \quad \text{desired signal}$$

$$\underline{w}_{opt,j} \stackrel{def}{=} \underset{\underline{w}_j}{\operatorname{argmax}}\left\{\frac{\underline{w}_j^H R_{ss} \underline{w}_j}{\underline{w}_j^H R_{jj} \underline{w}_j}\right\} \quad \text{upper interference}$$

which may be considered the initial step to calculate the weighting coefficients in three sub-bands. To solve the maximization problem the complex gradient of the SINR for each bin may be taken with respect to the complex-weights and the result set to zero, which yields, for example, for the lower 1st adjacent interference signal $$\nabla_{\underline{w}_i^H}\left\{\frac{\underline{w}_i^H R_{ss} \underline{w}_i}{\underline{w}_i^H R_{ii} \underline{w}_i}\right\} = \nabla_{\underline{w}_i^H}\left\{(\underline{w}_i^H R_{ss} \underline{w}_i)(\underline{w}_i^H R_{ii} \underline{w}_i)^{-1}\right\} = 0 \quad \text{(eq. 22)}$$

where $\nabla\{\bullet\}$ is the expression for taking the complex gradient. Applying partial-differentiation may result in $R_{ss}\underline{w}_i(\underline{w}_i^H R_{ii}\underline{w}_i)^{-1} - (\underline{w}_i^H R_{ii}\underline{w}_i)^{-2} R_{ii}\underline{w}_i(\underline{w}_i^H R_{ss}\underline{w}_i) = 0$ (eq. 23), which may be rewritten as the expression $$R_{ss}\underline{w}_i(\underline{w}_i^H R_{ii}\underline{w}_i)^{-1} = \quad \text{(eq. 24)}$$

$$(\underline{w}_i^H R_{ii}\underline{w}_i)^{-2} R_{ii}\underline{w}_i(\underline{w}_i^H R_{ss}\underline{w}_i) \Rightarrow R_{ss}\underline{w}_i = R_{ii}\underline{w}_i \frac{\underline{w}_i^H R_{ss}\underline{w}_i}{\underline{w}_i^H R_{ii}\underline{w}_i} \stackrel{\Delta}{=} R_{ii}\underline{w}_i\lambda_i$$

$$\text{where } \lambda_i \stackrel{def}{=} \frac{s}{i+n} = \frac{\underline{w}_i^H R_{ss}\underline{w}_i}{\underline{w}_i^H R_{ii}\underline{w}_i} \quad \text{(eq. 25)}$$

may be defined as the SINR of the frequency-bin for the lower 1st adjacent interference signal. This may be rewritten as $R_{ss}\underline{w}_i = R_{ii}\underline{w}_i\lambda_i \Rightarrow (R_{ii}^{-1}R_{ss})\underline{w}_i = \lambda_i\underline{w}_i$ (eq. 26) which is an Eigen-value problem whose solution provides the optimal weights for maximizing the SINR: $\underline{w}_{opt,i} = P\{R_{ii}^{-1} R_{ss}\}$ (eq. 27), where $P\{\bullet\}$ is the operator that returns the principal Eigen-vector of a matrix based on the PCA.

With a two-antenna ULA, the sample co-variance matrix may be a 2-by-2 matrix and the characteristic-function to compute the Eigen-vectors is a quadratic-function expressed as $$\lambda^2 - tr\{A\}\lambda + \det\{A\} = 0 \Rightarrow \lambda_{1,2} = \frac{tr\{A\} \pm \sqrt{tr\{A\}^2 - 4 \cdot \det\{A\}}}{2} \quad \text{(eq. 28)}$$

where $A \triangleq R_{ii}^{-1} R_{ss}$, $tr\{A\}$ is the trace of matrix A, and $\det\{A\}$ is the determinant of matrix A.

Similar results may be derived in a similar-way for the desired signal and the upper $1^{st}$ adjacent interference signal. However, the sample co-variance matrix $R_{nn}$ of independent zero-mean complex-Gaussian noise variables may be assumed to be a diagonal-matrix with noise variances $\sigma^2$ on the main-diagonal. Note the desired signal may not have an interference signal (one reason why it is used for the training signal). By taking the inverse of the noise-matrix there will be values only on the main diagonal, such that the desired signal will be scaled, but will not change the Eigen-vectors. Therefore, the inverse sample covariance matrix $R_{nn}^{-1}$ may also be expressed as a diagonal matrix and $R_{nn}^{-1} R_{ss} \propto R_{ss} \Rightarrow \underline{w}_{opt,s} = P\{R_{nn}^{-1} R_{ss}\} \propto P\{R_{ss}\}$ (eq. 29). Finally, the optimal weights for the lower and upper 1st adjacent interference signal and the desired signal may be expressed as $\underline{w}_{opt,i} = P\{R_{ii}^{-1} R_{ss}\}$ lower interference $\underline{w}_{opt,s} = P\{R_{ss}\}$ desired signal $\underline{w}_{opt,j} = P\{R_{jj}^{-1} R_{ss}\}$ upper interference (eq. 30)

where the Eigen-vectors are computed by solving "straightforward" quadratic characteristic-functions for each of the three frequency-bins.")

Generating Logical Indicators Based on the AoAs

Now, by recalling the steering-vector computations that were discussed above under the heading "Steering-vector computation" we might obtain the AoAs (for a two-antennae ULA) of the received lower 1st-adjacent interference-signal, of the received desired-signal, and of the received upper 1st-adjacent interference-signal, respectively, as follows;

$$\varphi_i \stackrel{def}{=} \sin^{-1}\left(\frac{\Im\{\ln(sv_{i,1})\}}{\pi}\right), \quad \text{Eq. 31}$$

with $\underline{sv}_i \stackrel{def}{=} \begin{bmatrix} sv_{i,0} \\ sv_{i,1} \end{bmatrix}$ for the lower interference, $$\varphi_s \stackrel{def}{=} \sin^{-1}\left(\frac{\Im\{\ln(sv_{s,1})\}}{\pi}\right),$$

with $\underline{sv}_s \stackrel{def}{=} \begin{bmatrix} sv_{s,0} \\ sv_{s,1} \end{bmatrix}$ for the desired signal, $$\varphi_j \stackrel{def}{=} \sin^{-1}\left(\frac{\Im\{\ln(sv_{j,1})\}}{\pi}\right),$$

with $\underline{sv}_j \stackrel{def}{=} \begin{bmatrix} sv_{j,0} \\ sv_{j,1} \end{bmatrix}$ for the upper interference, Next, we can apply our comparison-criteria by using these AoAs. Therefore, we propose to use the obtained AoAs to identify if the received lower and upper 1st-adjacent interference-signals are spatially separated from the desired-signal. If these signals are too close to the desired-signal then self-nulling might occur due to a lack-of-spatial-separation. The decision-criterion for determining if there is a lack-of-spatial-separation between the received lower 1st-adjacent interference-signal and the received desired-signal is given by;

$$L_{is} = \begin{cases} \text{True} & \Leftrightarrow \quad |\varphi_i - \varphi_s| < \Delta\phi_{is} \\ \text{False} & \Leftrightarrow \quad \text{Otherwise} \end{cases} \quad \text{Eq. 32}$$

and between the received upper 1st-adjacent interference-signal and the received desired-signal is given by;

$$L_{js} = \begin{cases} \text{True} & \Leftrightarrow \quad |\varphi_j - \varphi_s| < \Delta\phi_{js} \\ \text{False} & \Leftrightarrow \quad \text{Otherwise} \end{cases} \quad \text{Eq. 33}$$

Where $\{\Delta\phi_{is}, \Delta\phi_{js}\}$ are outer-threshold-values that can be considered as variables for setting appropriate values for determining whether or not the two signals are sufficiently close to each other spatially (e.g., 10° for both the 1st- and 2nd-adjacent interference-signals). These values might be obtained via, e.g., "field-testing" or other means of spatial modelling of (H)IBOC-transmission scenarios. The logical indicators [$L_{is}$, $L_{js}$] are output by step 607 in FIG. 6 and are used to decide which procedure to follow to prevent self-nulling—that is, whether or not to set the weighting-values for subsequent constructive or destructive combination.

Setting Weighting-Values for Prevention of Self-Nulling

In this example the step of setting weighting-values is shown as six sub-steps that together set the first-weighting-values ($w_{opt,i}$), the second-weighting-values ($w_{opt,s}$), and also the third-weighting-values ($w_{opt,j}$). These sub-steps are:

generating a first-frequency-bin-matrix 676,
generating a second-frequency-bin-matrix 678,
generating a third-frequency-bin-matrix 680,
determining weighting-values for maximizing SINR 651 based on the three frequency-bin-matrices 676, 678, 680,
determining weighting-values for constructively combining each of the three frequency bins 653, and
selecting 655 whether to output the weighting-values from step 651 or 653 for each of the three frequency bins based on the logical indicators [$L_{is}$, $L_{js}$] that are output by step 607.

The steps of generating the frequency-bin-matrices 676, 678, 680 and determining weighting-values for maximizing SINR 651 has been discussed in detail above. As indicated above, the steps of generating the frequency-bin-matrices 676, 678, 680 is common to both this section and also the "Steering Vector Computation" section.

The step of determining weighting-values for maximizing SINR 651 can be summarised as: setting the first-weighting-values ($w_{opt,i}$) as values for destructively combining the information that corresponds to the first-frequency-bins of the plurality of antenna-signals; setting the second-weighting-values ($w_{opt,s}$) as values for constructively combining the information that corresponds to the second-frequency-bins of the plurality of antenna-signals; and setting the third-weighting-values ($w_{opt,j}$) as values for destructively combining the information that corresponds to the third-frequency-bins of the plurality of antenna-signals, see above for more details. Each of these (interim) set of weighting-values is provided as an input to the selecting step 655.

The step of determining weighting-values for constructively combining each of the three frequency bins 653 can involve setting the first-weighting-values ($w_{opt,i}$) and the third-weighting-values ($w_{opt,j}$) as the same values that were set for the second-weighting-values ($w_{opt,s}$) at step 651 (determining weighting-values for maximizing SINR). This can be considered as over-ruling the destructive first- and second-weighting-values that were determined at step 651.

At steps 676, 678, and 680 the N co-variance matrices of the $1^{st}$ adjacent interference representative sample signals, ($R_{ii}$, $R_{jj}$), and the N co-variance matrix of the representative sample desired signal, $R_{ss}$ are generated. Note that, in this example, the matrices will be 2×2 matrices as there are two antennas in the array; the main diagonal will correspond to information about the interference or desired signal, and the secondary diagonal will correspond to information about the spatial correlation of the interference or desired signal (depending on which matrix is considered).

Once the matrices are generated 676, 678, and 680, the step of determining weighting-values for maximizing SINR 651 calculates weighting-values that maximize the Signal-to-Interference+Noise-Ratio (SINR) based on the inverse of the N co-variance matrices of the 1st adjacent interference representative sample signals and the N co-variance matrix of the representative sample desired signal, respectively, see above. In this way, the first- and third-weighting values are determined for subsequent destructive combination, and the second-weighting values are determined for subsequent constructive combination.

The co-variance matrix may be used as a measure for the signal power of the desired signal and of the interference signal. The beam former maximizes the signal for SINR, the maximum power of the desired signal and minimum contribution of the interference plus noise, because this will result in a determination of the directionality; this condition will correspond to the direction of origination of the signal. The weights may be computed nearly instantaneously using "estimation-and-plug" techniques by solving an eigenvalue problem with a "principal-component-analysis" (PCA) method as described above. Consequently, the complex base-band beam forming algorithm is fast, i.e., it has a low-latency.

The step of selecting 655 whether to output the weighting-values from step 651 or 653 is based on the logical indicators [$L_{is}$, $L_{js}$] from step 607. The logical indicators [$L_{is}$, $L_{js}$] indicate whether or not there is a lack-of spatial-separation, and with this information the method decides what to do to prevent the self-nulling.

That is, if $L_{is}$ is true, then the first-weighting values generated by step 653 (for constructive combining) are output for applying to the first-frequency-bin. If $L_{is}$ is false, then the first-weighting values generated by step 651 (for destructive combining) are output for applying to the first-frequency-bin. Similarly, if $L_{js}$ is true, then the third-weighting values generated by step 653 (for constructive combining) are output for applying to the third-frequency-bin. If $L_{js}$ is false, then the third-weighting values generated by step 651 (for destructive combining) are output for applying to the third-frequency-bin. This process can be considered as preventing self-nulling, and will be described in more detail below.

For the received desired-signal a beam-former that applies the weighting-values generated by step 651 for maximizing SINR might compute the weighting-values as optimal beam-forming weights to perform a constructive-adding of the received desired-signal at the ULA, i.e., it "constructively-combines" the multi(two)-antennae desired output-signals. However, the method of FIG. 6 can determine whether or not there is a lack-of-spatial-separation between the interferer and the desired signal, that is, whether or not the AoAs of the desired signal and of either one or both of the interference signals have similar values such that they are spatially quite close. If there is lack-of-spatial information, then this means that a beam-forming algorithm is not capable of distinguishing between (spatially) different signals. In this case it would be appropriate to apply a "constructive-combining" on the interference-signals that have the similar AoA as the desired-signal. Moreover, this seems to be an appropriate choice due to the fact that the beam-former is anyway not able to make a spatial distinction between these signals. Note, the optimal-weights for constructive-combining might already be available, since they might be computed for the received desired signal (that is, the second-frequency-bin). This means that if, for example, the lack-of-spatial-separation logical indicator $L_{is}$ for the lower 1st-adjacent interference-signal is "True" than the optimal weights of the desired-signal (second-frequency-bin) should be also applied for the received lower 1st-adjacent interference-signal (first-frequency-bin) to obtain constructive-combining. A same consideration applies for the $L_{js}$ indicator, i.e., if $L_{js}$ is "True" then the optimal-weights of the desired-signal (second-frequency-bin) should also be applied for the received upper 1st-adjacent interference-signal (third-frequency-bin) to obtain constructive-combining. Consequently, if both indictors are "True" than the optimal-weights (for the second-frequency-bin) are used for the lower 1st-adjacent interference-signal (first-frequency-bin) as well as for the upper 1st-adjacent interference-signal (third-frequency-bin). In this case, all signals are constructively-combined.

In another embodiment the optimal-weights for combining might be also "adjusted" with information of the $1^{st}$-frequency-bin (or $3^{rd}$-frequency-bin) covariance-matrix. For example, the weights of the $2^{nd}$ frequency-bin that are applied in the combining may be an "adjusted/weighted" version of the optimal-weights for the second-frequency-bin. The adjustment may be based on information from the spatial covariance matrix of the $1^{st}$ (or $3^{rd}$) frequency-bin. In this way, a first-weighting-determination-block can determine adjusted-second-weighting-values by modifying the second-weighting-values based on a spatial covariance matrix of the information in the plurality of antenna-signals that corresponds to the first-frequency-bin; and set the first-weighting-values as the adjusted-second-weighting-values. Similarly, the third-weighting-determination-block can set the third-weighting-values based on the corresponding signals associated with the third-frequency-bin.

Thus, thanks to applying the constructive-combining approach, if either of the lack-of-spatial-separation logical indicators [$L_{is}$, $L_{js}$] is "True", no self-nulling will occur when the signals are spatially too close. Note, however, as a consequence of this constructive-combining approach the suppression of the 1st-adjacent interference-signals is also not possible anymore if either of the logical indicators [$L_{is}$, $L_{js}$] is "True". On the other hand, this is to be expected since the beam-former has in this case no spatial-information to separate the received desired-signal from the received lower ($L_{is}$ is "True"), upper ($L_{js}$ is "True"), or lower and upper ($L_{is}$, $L_{js}$ are both "True") 1st-adjacent interference-signals.

Applying the Weighting Values

As indicated above, the method of FIG. 6 includes three correction-paths: a first-correction-path 657, a second-correction-path 659 and a third-correction-path 661.

The first-correction-path 657 is for combining the first-frequency-bins of each of the plurality of antenna-signals in line with the first-weighting-values. As discussed above, the first-weighting-values are set so as to either constructively or destructively combine the first-frequency-bins of each of the plurality of antenna-signals.

The second-correction-path 659 is for constructively combining the second-frequency-bins of each of the plurality of antenna-signals in line with the second-weighting-values. As discussed above, the second-weighting-values are set so as to constructively combine the second-frequency-bins.

The third-correction-path 661 is for combining the third-frequency-bins of each of the plurality of antenna-signals in line with the third-weighting-values. As discussed above, the third-weighting-values are set so as to either constructively or destructively combine the third-frequency-bins.

In this example, the first-, second- and third-weighting-values each comprise a plurality of antenna-weighting-values, one for each of the plurality of antenna-signals. Each of the antenna-weighting-values may be a complex number.

In the first-correction-path 657, a first step 686 of frequency shifting by +200 kHz is performed so that the center of the first-frequency-bin of each antenna-signal is located at 0 Hz. Then at step 692, the frequency shifted signals provided by step 686 are low-pass filtered (LPF) by a filter with a cut-off frequency of 100 kHz, centered around 0 Hz (i.e. from −100 kHz to 100 kHz) with a finite impulse response (FIR) of 32-taps in this example. As a result, the output signals from the filtering at step 692 will include the entire first-frequency-bin. These output signals can be considered as first-frequency-bin-antenna-signals.

Similarly, in the third-correction-path 661, a first step 690 of frequency shifting by −200 kHz is performed so that the center of the third-frequency-bin of each antenna-signal is located at 0 Hz. Then at step 694, the frequency shifted signals provided by step 690 are low-pass filtered (LPF) by a filter with a cut-off frequency of 100 kHz, centered around 0 Hz (i.e. from −100 kHz to 100 kHz) with a finite impulse response (FIR) of 32-taps in this example. As a result, the output signals from the filtering at step 694 will include the entire third-frequency-bin. These output signals can be considered as second-frequency-bin-antenna-signals.

In the second-correction-path 659, a frequency shifting step is not required because the center of the second-frequency-bin of each antenna-signal is already located at 0 Hz. At step 698, the antenna signals are low-pass filtered (LPF) by a filter with a cut-off frequency of 100 kHz, centered around 0 Hz (i.e. from −100 kHz to 100 kHz) with a finite impulse response (FIR) of 32-taps in this example. As a result, the output signals from the filtering at step 698 will include the entire second-frequency-bin. These output signals can be considered as second-frequency-bin-antenna-signals.

The method of FIG. 6 includes a first-weighting-application-step 618 that applies the first-weighting-values ($w_{opt,i}$) to the first-frequency-bin-antenna-signals in order to combine the signals and provide a weighted-first-frequency-bin-signal. In this way the first-weighting-values are applied to information that corresponds to the first-frequency-bin in the plurality of antenna-signal in order to either constructively or destructively combine the signals.

Similarly, a third-weighting-application-step 646 applies the third-weighting-values ($w_{opt,j}$) to the third-frequency-bin-antenna-signals in order to combine the signals and provide a weighted-third-frequency-bin-signal. In this way the third-weighting-values are applied to information that corresponds to the third-frequency-bin in the plurality of antenna-signal in order to either constructively or destructively combine the signals.

A second-weighting-application-step 626 applies the third-weighting-values ($W_{opt,s}$) to the second-frequency-bin-antenna-signals in order to combine the signals and provide a weighted-second-frequency-bin-signal. In this way the second-weighting-values are applied to information that corresponds to the second-frequency-bin in the plurality of antenna-signal in order to constructively combine the signals.

A signal-combining step 634 then combines the weighted-first-frequency-bin-signal, the weighted-second-frequency-bin-signal, and the weighted-third-frequency-bin-signal. In this example, since frequency shifting was applied in the first-correction-path 657 and the third-correction-path 661, a corresponding reverse frequency shift is applied to each of the weighted-first-frequency-bin-signal and the weighted-third-frequency-bin-signal before the three signals are combined. The output of the signal-combining step 634 is the output-signalling with an improved SINR, and with a selectively applied reduction of interference in the first- and third-frequency-bins. The selective reduction of interference is applied depending upon whether or not the signalling in the first- and third-frequency-bins originates from a similar direction to the signalling in the second-frequency-bin.

A FURTHER EXAMPLE EMBODIMENT

We will now describe a further example embodiment, which utilises two surrogate/training signals for the first- and third-frequency-bins. These two signals for each frequency-bin may be referred to as an outer- and inner-subsets of the frequency-bins.

The electronically-steered beam forming approach for maximizing SINR that is discussed above is capable of performing constructive (coherent) addition of the received desired-signal. This type of beam forming with suppression and combining capabilities should then be able to make an efficient choice, in terms of SNR, between suppression and combining the so called; "trade-off of suppression-against-combining"-procedure. The following discussion expand the procedure for the AoA computation with two extra portions of roughly 100 kHz wide (frequency-bin of 100 kHz) to obtain two extra training-signals or surrogate-signals (representatives). The two extra surrogate-signals are;
i) an inner-subset of the first-frequency-bin (between −200 and −100 kHz), which may be referred to as a "lower mixed-signal" where the desired-(H)IBOC-signal is contaminated with noise and a possible lower 1st-adjacent interference-signal, and
ii) an inner-subset of the third-frequency-bin (between +100 and +200 kHz), which may be referred to as a "upper mixed-signal" with contamination on the desired-(H)IBOC-signal by noise and a possible upper 1st-adjacent interference-signal.

Similarly, the portion of the first-frequency-bin that is between −300 and −200 kHz is referred to as an outer-subset of the first-frequency-bin or a "lower 1st-adjacent (FM)-interference-signal". The portion of the third-frequency-bin that is between +200 and +300 kHz is referred to as an outer-subset of the third-frequency-bin or a "upper 1st-adjacent (FM)-interference-signal".

Hence, to compute AoAs for the trade-off procedure proposed in the following description, for both an upper and lower first adjacent interferer) we will use in total five surrogate-signals, i.e.;

i) for the desired-(H)IBOC-signal (between −100 and +100 kHz),
ii) for the lower 1st-adjacent (FM)-interference-signal (between −300 and −200 kHz),
iii) for the upper 1st-adjacent (FM)-interference-signal (between +200 and +300 kHz),
iv) for the lower mixed-signal (between −200 and −100 kHz), and
v) for the upper mixed-signal (between +100 and +200 kHz).

The portions i-iii are described above with reference to FIGS. 5 and 6. Therefore we will focus, in the description of this embodiment, on portions iv and v for the lower mixed-signal and the upper mixed-signal, respectively.

We then propose that the AoA is used to decide, similar to the functionality described above with reference to FIGS. 5 and 6, about "spatial-separation" between the desired-signal and a 1st-adjacent interference-signal. However, in this embodiment we extend this decision-criterion with a decision, based on the AoA of the lower or upper mixed-signal, of the "spatial-distance" between the desired-signal and a mixed-signal. Finally, we decide for constructive-combining, similar to the functionality of FIGS. 5 and 6, if there is a "lack-of-spatial-separation" of the desired-signal and a 1st-adjacent interference-signal or, in this embodiment, also if there is a "lack-of-spatial-distance" between the desired-signal and a mixed-signal. Next we will discuss the generation of the two extra mixed-signals we are proposing for the trade-off procedure.

Figure 7:
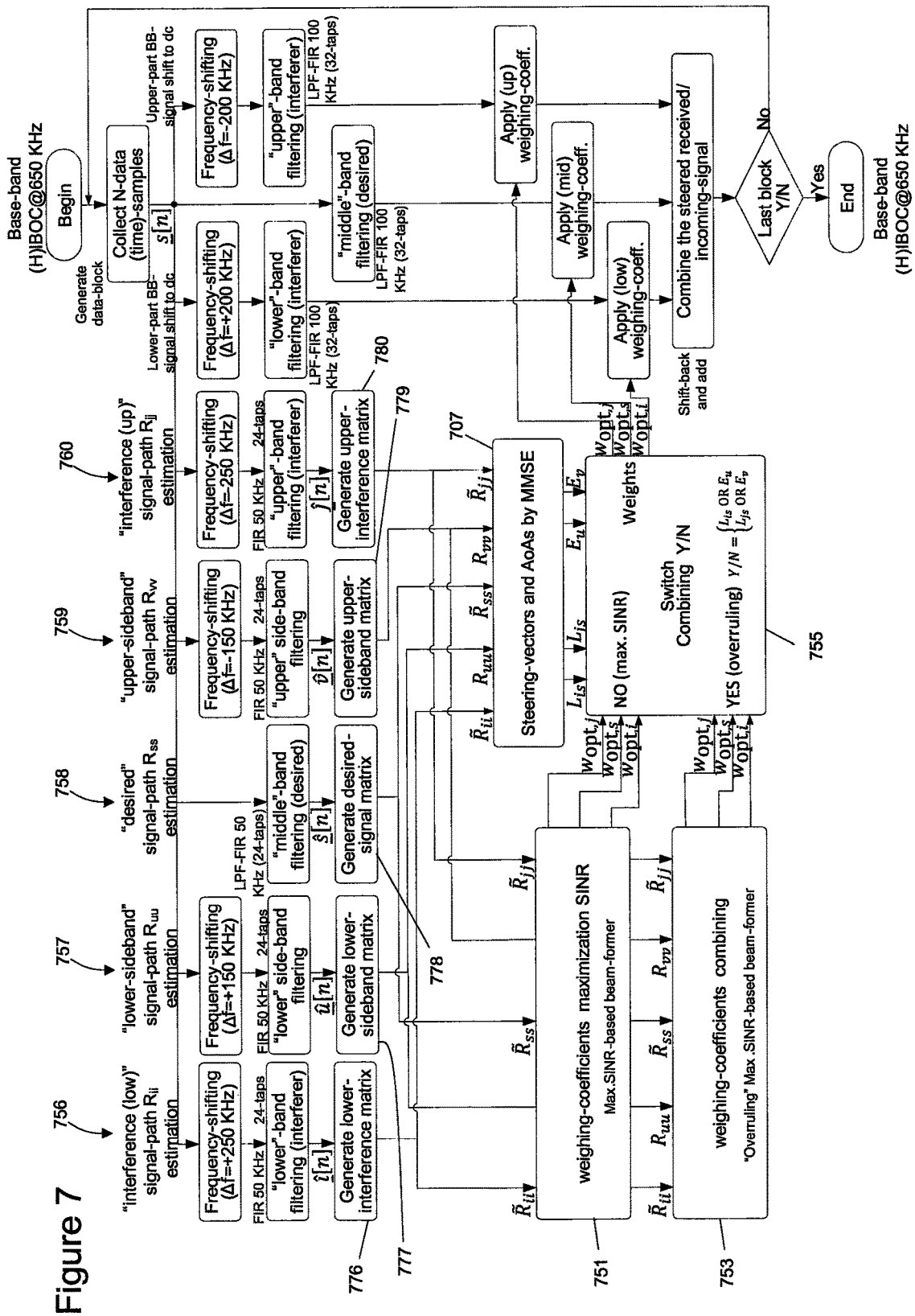
FIG. 7 shows another method of operating a receiver system.

FIG. 7 shows another method of operating a receiver system, which can be considered as an extension to the processing of FIG. 6. Features of FIG. 7 that have already been described with reference to FIG. 6 will not necessarily be described again here.

In addition to the three estimation-paths 756, 758, 760 of FIG. 6, the method of FIG. 7 includes a first-inner-estimation-path 757 and a third-inner-estimation-path 759. The first-inner-estimation-path 757 is for determining the AoA of the lower mixed signal (the inner-subset of the first-frequency-bin between −200 and −100 kHz), and also for contributing to the determination of the first-weighting-values. The third-inner-estimation-path 759 is for determining the AoA of the upper mixed signal (the inner-subset of the third-frequency-bin between +100 and +200 kHz) and also for contributing to the determination of the third-weighting-values.

Lower and Upper Mixed-Signal Generation

In a similar way to the first- and third-estimation-paths 756, 760 that are described with reference to FIG. 6, the lower mixed-signal is frequency shifted by +150 kHz such that it's centre is at 0 kHz. Also, the upper mixed-signal is frequency shifted by −150 kHz such that it's centre is at 0 kHz. Then each of these frequency-shifted signals is filtered using a low-pass filter (LPF) of 50 kHz around 0 Hz.

As can be seen from FIG. 3, the upper and lower mixed signals contain a mix of the received desired-(H)IBOC-signal and a 1st-adjacent interference-signal. For the trade-off-procedure we are interested in, we determine the AoAs of these mixed-signals to decide for combining or suppression of the lower or upper $1^{st}$-adjacent interference-signal. That is, whether or not to set weighting-values for constructive or destructive combination of the first- and third-frequency bins. However, before we can use the AoA of a mixed-signal we first need to compute the steering-vector of that mixed-signal, which is the topic of the below section under the heading "Mixed-signal steering-vector computation".

Mixed-Signal Steering-Vector Computation

The computation of a steering-vector for the lower or upper-mixed-signal will be introduced in this section. Computation of the steering-vector for a mixed-signal is the same procedure as described above for the outer-subsets of the first- and third-frequency-bins. Moreover, each of the steering-vectors for the mixed-signals are obtained by using the inner-subsets of the first- and third-frequency-bins.

The surrogates of the received lower mixed-signal and the received upper mixed-signal are passed to a so called; "Trade-off of suppression-against-combining" algorithm. This trade-off algorithm, which can be implemented by the "determining steering-vectors and AoAs by MMSE" step 707, calculates two extra steering-vectors compared to the steering-vectors that are computed in the example of FIG. 6. These two extra steering-vectors are the steering-vector for the received lower mixed-signal and the steering-vector for the upper mixed-signal. As discussed above, a steering-vector of a received signal has a one-to-one relation with the angle-of-arrival (AoA) of that signal. Therefore, the steering-vector of a mixed-signal contains the necessary spatial-information to compare the mixed-signal in the spatial-domain against the spatial information of the received desired-(H)IBOC-signal. Moreover, we will address a specific comparison criterion for the lower and for the upper mixed-signal below under the heading "Mixed-signal angle-of-arrival comparison". As indicated above, and also for the mixed-signals, the computation of the steering-vectors can be nearly instantaneous by solving an Eigen-value problem with the help of the "principal-component-analysis" (pca)-method, the so called; "estimation-and-plug" techniques. Moreover, as discussed above, the principal-component is proportional to the required steering-vector. In addition, also here, the proposed complex base-band "trade-off of suppression-against-combining" algorithm is fast, i.e., it has a low-latency. Actually, the latency is only determined by the observations (samples) required to compute the spatial-covariance matrix. Note, that the above description of FIG. 6 relates to computing steering-vectors with the pca-method for the received desired-signal as well as for the 1st-adjacent interference-signals. In addition, for the embodiment of FIG. 7, a similar procedure is used to obtain steering-vectors for the mixed-signals, which are then used, i.e., the AoAs, to make an appropriate trade-off between suppression and combining.

Also here, as for FIG. 6, the computation-criterion for the steering-vector in the trade-off algorithm is the minimization of the mean-square-error (MMSE), i.e., the Wiener-Hopf criterion. Moreover, the procedure to compute the steering-vectors $\underline{sv}_u$ and $\underline{sv}_v$ from the sample-based spatial-covariance-matrices $R_{uu}$ and $R_{vv}$ for the lower mixed-signal u and the upper mixed-signal v, respectively, is similar to that described above for the desired-signal as well as for the 1st-adjacent interference-signals. Therefore for the extra mixed-signals, proposed in this embodiment, we directly show the computed steering-vectors (represented by their optimal-weights), this yields;

$\underline{w}_{opt,u} = P\{R_{uu}\} \triangleq \underline{sv}_u$ for the lower mixed-signal, $\underline{w}_{opt,v} = P\{R_{vv}\} \triangleq \underline{sv}_v$ for the upper mixed-signal,     Eq. 34 with the sample-based spatial covariance-matrices;

$$R_{uu} \triangleq \frac{1}{N}\sum_{n=1}^{N}\left(\underline{\hat{u}}[n]\cdot\underline{\hat{u}}^H[n]\right) \text{ for the lower mixed-signal,} \quad \text{Eq. 35}$$

$$R_{vv} \triangleq \frac{1}{N} \sum_{n=1}^{N} (\hat{\underline{v}}[n] \cdot \hat{\underline{v}}^H[n]) \text{ for the upper mixed-signal,}$$

where $\hat{\underline{u}}[n]$ is the stream of sample-vectors for the surrogate of the received lower mixed-signal and $\hat{\underline{v}}[n]$ is the stream of sample-vectors for the surrogate of the received upper mixed-signal. Also here the Eigen-vectors are computed by solving the quadratic characteristic-functions for the two surrogate signals in the two extra frequency-bins. As a result we obtain two extra steering-vectors, $\{\underline{sv}_u, \underline{sv}_v\}$, which we will use to compute the AoAs of these received mixed-signals. These AoAs are then compared to decide if there is lack-of-spatial-distance with the received desired-(H)IBOC-signal. This mixed-signal AoA comparison procedure will be described in the next section.

Mixed-Signal Angle-of-Arrival Comparison

In this section, we will introduce comparison-criteria to make an appropriate trade-off in terms of SNR between suppression and combining, for example, for the beam-forming approach as described with reference to FIG. 6.

This trade-off algorithm is based on the availability of;
i) the steering-vectors of the mixed-signals (inner-subsets of the first- and third-frequency-bins) computed as explained in the preceding section,
ii) the steering-vector of the received desired-signal (second-frequency-bin), and
iii) the steering-vectors of the 1st-adjacent interference-signals (outer-subsets of the first- and third-frequency-bins) both of which are described above with reference to FIG. 6.

The decision-criterion makes use of the AoA-information that is obtained from these steering-vectors. More specifically, a decision is based on the difference between the AoAs of the received desired-signal and a received lower or upper 1st-adjacent interference-signal combined with the difference between the AoAs of the received desired-signal and a received lower or upper mixed-signal. In the remainder of this section we will explain the comparison and the according decision-criteria.

In a similar way to that of FIG. 6, the AoAs (for a two-antennae ULA) of the received lower mixed-signal and of the received upper mixed-signal can be obtained from their steering-vectors, respectively, as follows;

$$\varphi_u \stackrel{def}{=} \sin^{-1}\left(\frac{\Im\{\ln(sv_{u,1})\}}{\pi}\right), \quad \text{Eq. 36}$$

with $\underline{sv}_u \stackrel{def}{=} \begin{bmatrix} sv_{u,0} \\ sv_{u,1} \end{bmatrix}$ for the lower mixed-signal, $$\varphi_v \stackrel{def}{=} \sin^{-1}\left(\frac{\Im\{\ln(sv_{v,1})\}}{\pi}\right),$$

with $\underline{sv}_v \stackrel{def}{=} \begin{bmatrix} sv_{v,0} \\ sv_{v,1} \end{bmatrix}$ for the upper mixed-signal, Now we propose to use the obtained AoAs to identify if the received lower and upper mixed-signals have sufficient spatial-distance from the received desired-signal. However, the criterion for sufficient spatial-distance between a mixed-signal and the desired-signal depends also on the spatial-separation between the desired-signal and a 1st-adjacent interference-signal. Note, that the lower or upper mixed-signal is actually a mixture of the desired-signal and the lower or upper 1st-adjacent interference-signal. If the spatial-distance between a mixed-signal and the desired signal is smaller than a fraction $\alpha$, with $\alpha \leq 1$, of the spatial-separation between a 1st-adjacent interference-signal and the desired-signal there is a so called; "lack-of-spatial-distance" between the lower or upper mixed-signal and the desired-signal. The decision-criterion for determining if there is a lack-of-spatial-distance between the received lower mixed-signal and the received desired-signal is given by;

$$\tilde{E}_u = \begin{cases} \text{True} & \Leftrightarrow \quad |\varphi_u - \varphi_s| < \alpha_u |\varphi_i - \varphi_s| \\ \text{False} & \Leftrightarrow \quad \text{Otherwise} \end{cases} \quad \text{Eq. 37}$$

Where the computation of $\{\varphi_i, \varphi_s\}$ is described above with reference to FIG. 6, and between the received upper mixed-signal and the received desired-signal is given by;

$$\tilde{E}_v = \begin{cases} \text{True} & \Leftrightarrow \quad |\varphi_v - \varphi_s| < \alpha_v |\varphi_j - \varphi_s| \\ \text{False} & \Leftrightarrow \quad \text{Otherwise} \end{cases} \quad \text{Eq. 38}$$

Where the computation of $\varphi_j$ is described above with reference to FIG. 6, and where $\{\alpha_u, \alpha_v \leq 1\}$ are variables that can be set to appropriate values (e.g., for both to 0.45). These values might be obtained via, e.g., "field-testing" or other means of spatial modelling of (H)IBOC-transmission scenarios.

Moreover, with the first simulations with captured (H)IBOC-signals out of the field, it was seen that the AoAs, $\{\varphi_u, \varphi_v\}$, might have quite some fluctuations. Therefore, it is proposed to average (with a "running-average") these AoAs over $N_u$, respectively, $N_v$ block of N-observations, this yields for the lower mixed-signal;

$$E_u = \begin{cases} \text{True} & \Leftrightarrow \quad |\overline{\varphi_u} - \varphi_s| < \alpha |\varphi_i - \varphi_s| \\ \text{False} & \Leftrightarrow \quad \text{Otherwise} \end{cases} \quad \text{Eq. 39}$$

and for the upper mixed-signal;

$$E_v = \begin{cases} \text{True} & \Leftrightarrow \quad |\overline{\varphi_v} - \varphi_s| < \alpha |\varphi_j - \varphi_s| \\ \text{False} & \Leftrightarrow \quad \text{Otherwise} \end{cases} \quad \text{Eq. 40}$$

With the running-average AoA values given by;

$$\overline{\varphi_u} \triangleq \frac{1}{N_u} \sum_{n=1}^{N_u} \varphi_u[n] \text{ for the lower mixed-signal,} \quad \text{Eq. 41}$$

$$\overline{\varphi_v} \triangleq \frac{1}{N_v} \sum_{n=1}^{N_v} \varphi_v[n] \text{ for the upper mixed-signal,}$$

where $\{N_u, N_v\}$ are variables that can be set to appropriate values (e.g., for both to 4). These values might be obtained via, e.g., "field-testing" or other means of spatial modelling of (H)IBOC-transmission scenarios. Note that due to this extra averaging the latency increases proportional to the number of $\{N_u, N_v\}$ block of N-observations. The logical indicators $[E_u, E_v]$ are used to decide which procedure to follow to make an appropriate trade-off in SNR between suppression and combining. The procedure to follow, is the last-part of this embodiment of the trade-off of suppression-against-combining algorithm and will be discussed in the next section.

Trade-Off of Suppression-Against-Combining

Finally, the last-part of the trade-off of suppression-against-combining algorithm is indeed making the appropriate choice between suppression and combining. The logical indicators [$E_u$, $E_v$] indicate whether or not there is a lack-of spatial-distance, and with this information the method decides whether to do suppression (destructive combining) or combining (constructive combining) to obtain the optimal SNR for the digitally modulated signals.

In FIG. 7, step 751 for the determining weighting-values for maximizing SINR, is based on the same three frequency-bin-matrices 776, 778, 780 that are described above with reference to FIG. 6.

In addition to functionality of FIG. 6, in this example we also introduced a possible expansion of a beam-former by two logical indicators [$E_u$, $E_v$], which indicate whether or not there is a lack-of spatial-distance between the received mixed-signals and the received desired-signal. Note, that a lack-of-spatial-distance means that the AoAs of the desired signal and of either one or both of the mixed-signals have "close-enough" values, i.e., they are spatially "close-enough" to indicate lack-of-spatial-distance. The fact that there is lack-of-spatial-distance can result in a determination that a beam-forming algorithm should not try to suppress a 1st-adjacent interference-signal. Thus, because the mixed-signal information indicates in this case that the 1st-adjacent interference-signal is for example not devastating, i.e., it is more-or-less "harmless". If it is indeed a "harmless" 1st-adjacent interference-signal, then it would be appropriate to apply a "constructive-combining" on that 1st-adjacent interference-signal. Thus, if the lower or upper mixed-signal has a similar AoA as the desired-signal, then it is appropriate to apply constructive-combining for the lower or upper 1st-adjacent interference-signal (first- and third-frequency-bins). Note, the optimal-weights for constructive-combining might already be available, since they might be computed for the received desired-signal. Thus, this all means that if, for example, the lack-of-spatial-distance logical indicator $E_u$ for the lower mixed-signal is "True", then the optimal weights of the desired-signal should be also applied to the received lower 1st-adjacent interference-signal to obtain constructive-combining in the first-frequency-bin as well as in the second-frequency-bin. A same consideration for the $E_v$ indicator, i.e., if the $E_v$ is "True", then the optimal-weights of the desired-signal should also be applied to the received upper 1st-adjacent interference-signal to obtain constructive-combining in the third-frequency-bin as well as in the second-frequency-bin. Consequently, if both indictors are "True", then the optimal-weights are used for the lower 1st-adjacent interference-signal as well as for the upper 1st-adjacent interference-signal. In this case, constructive-combining is applied in all three frequency-bins, i.e., in the first-, second- and third-frequency-bins in the three correction-paths.

This can be implemented by step 755 as a logical-OR-function between the logical variables L and E. That is, if either $L_{is}$ OR $E_u$ is True, then the first-weighting-values ($w_{opt,i}$) are set as values for constructively combining. If either $L_{js}$ OR $E_v$ is True, then the third-weighting-values ($w_{opt,j}$) are set as values for constructively combining In a similar way to that described above with reference to FIG. 6, in another embodiment the optimal-weights for combining might be also "adjusted" with information of the 1st-frequency-bin (or 3rd-frequency-bin) covariance-matrix. For example, they may be "adjusted" based on covariance-matrices for the inner- and/or outer-$1^{st}$-frequency-bin, (and/or similarly for the $3^{rd}$-frequency-bin).

Thus, thanks to applying the constructive-combining approach if either of the lack-of-spatial-distance logical indicators [$E_u$, $E_v$] is "True", no unnecessary-suppression will occur when the mixed-signals are spatially "close-enough" to the desired-(H)IBOC-signal. Note, however, as a consequence of this constructive-combining approach the suppression of a "harmless" 1st-adjacent interference-signal is also not possible anymore if either of the logical indicators [$E_u$, $E_v$] is "True". On the other hand, this should be acceptable since the beam-former has "no-reason" to suppress the received "harmless" lower ($E_u$ is "true"), the received "harmless" upper ($E_v$ is "true"), or the received "harmless" lower and upper ($E_u$, $E_v$ are both "true") 1st-adjacent interference-signals. Moreover, this should also avoid the "unnecessary-attempt" to suppress lower, or upper 2nd-adjacent interference-signals.

Figure 8:
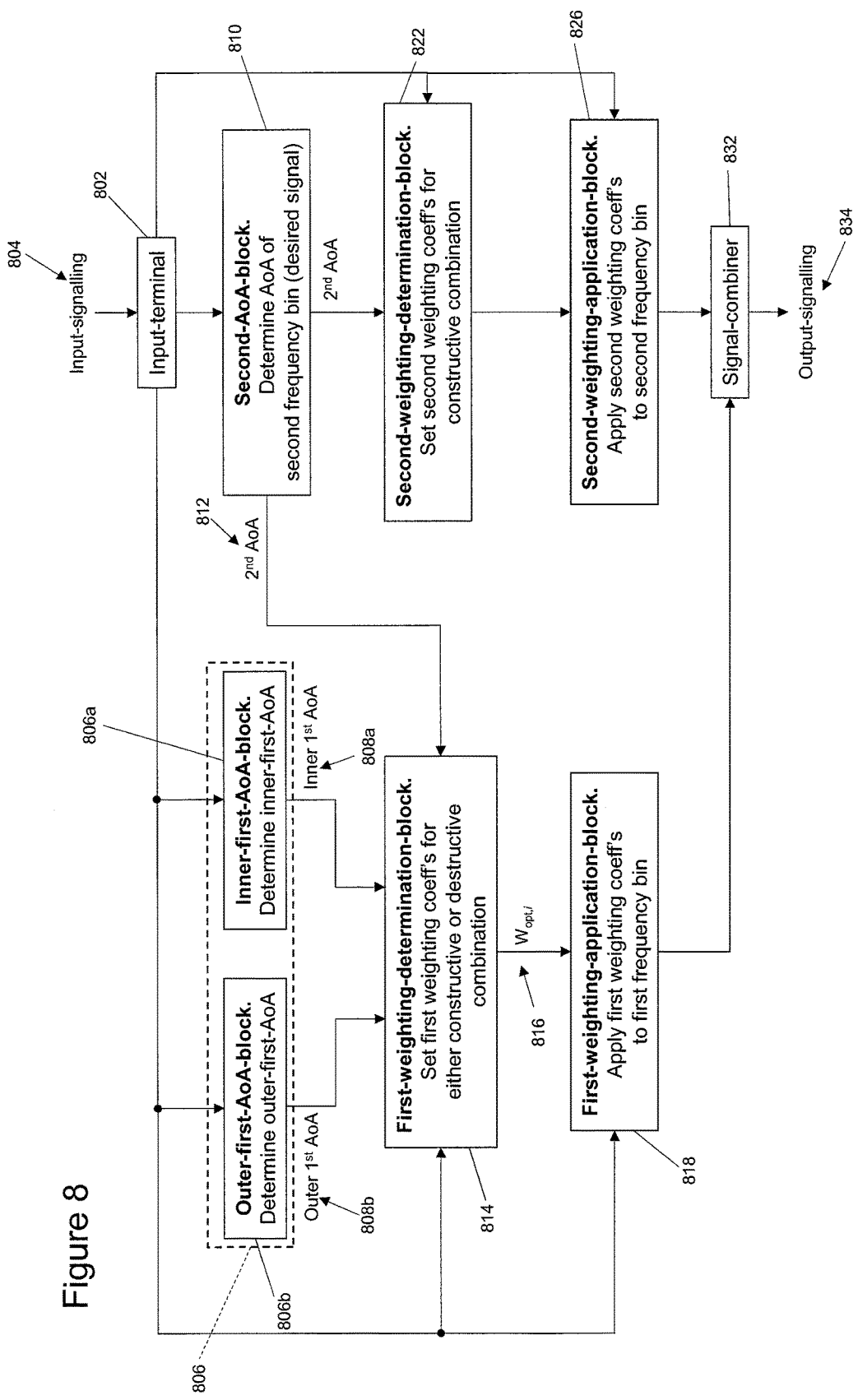
FIG. 8 shows a receiver system that represents a generalised version of the processing of FIG. 7.

FIG. 8 shows a receiver system 800 that represents a generalised version of the processing of FIG. 7 for one of the $1^{st}$ adjacent interference signals (first-frequency-bin). It will be appreciated that the system 800 of FIG. 8 can be extended so that it can also process the other 1st adjacent interference signals (third-frequency-bin). FIG. 8 shows a similar structure to that of FIG. 5. Features that have already been described with reference to FIG. 5 will not necessarily be described again here.

The receiver system 800 includes a first-AoA-block 806, which in this example includes an inner-first-AoA-block 806a and an outer-first-AoA-block 806b. The inner-first-AoA-block 806a determines an inner-first-AoA ($\varphi_u$) 808a associated with an inner-subset of the first-frequency-bin (between −200 kHz and −100 kHz). The outer-first-AoA-block 806b determines an outer-first-AoA ($\varphi_i$) 808b associated with an outer-subset of the first-frequency-bin.

The receiver system 800 includes a second-AoA-block 810 that determines a second-AoA 812 in the same way as FIG. 5.

A first-weighting-determination-block 814 performs the following processing to determine whether to set the first-weighting-values for constructively or destructively combining the information that corresponds to the first-frequency-bins of the plurality of antenna-signals:

In order to assist with "prevention of self-nulling" (using $L_{is}$ or $L_{js}$, as described above with reference to FIG. 6) for the $1^{st}$-frequency-bin:

Determine an outer-first-angle-difference-value ($|\varphi_i - \varphi_s|$) as the difference between the outer-first-angle-of-arrival ($\varphi_i$) 808b and the second-angle-of-arrival ($\varphi_s$) 812.

If the outer-first-angle-difference-value ($|\varphi_i - \varphi_s|$) is less than an outer-threshold-value ($\Delta\phi_{is}$), then:

set first-weighting-values ($w_{opt,i}$) 816 as values for constructively combining the information that corresponds to the first-frequency-bins of the plurality of antenna-signals. This is based on the first interference signal (in the first-frequency-bin) being considered too close, spatially, to the desired signal (second-frequency-bin), such that any destructive combination runs a risk of attenuating a desired digital sideband in the first-frequency-bin.

In order to assist with "prevention of unnecessary suppression" (using $E_u$ or $E_v$, as described above with reference to FIG. 7):

Determine an inner-first-angle-difference-value ($|\varphi_u-\varphi_s|$) as the difference between the inner-first-angle-of-arrival ($\varphi_u$) 808a and the second-angle-of-arrival ($\varphi_s$) 812;

if the inner-first-angle-difference-value ($|\varphi_u-\varphi_s|$) is less than a predetermined proportion ($\alpha_u$) of the outer-first-angle-difference-value ($|\varphi_l-\varphi_s|$), that is, the AoA of the lower mixed-signal is closer to the desired-signal than to the $1^{st}$-adjacent interference-signal (which can mean that the AoA of the inner first is close to the desired signal and so combining should be performed as it is a similar signal or at least does not have any spatial-difference with the desired-signal), then:

set the first-weighting-values ($w_{opt,i}$) 816 as values for constructively combining the information that corresponds to the first-frequency-bins of the plurality of antenna-signals. This is based on the signal in the inner-subset of the first-frequency-bin (between −200 and −100 kHz) being closer, spatially, to the desired digital sideband than the first interference signal in the first-frequency-bin. Therefore, since the lower mixed-signal AoA is close to the desired, signal, it is not considered to be "harmfully-contaminated" or the $1^{st}$ adjacent has a similar AoA. Nonetheless, combining is applied since the CIC can result in a "stronger" signal. It is recalled that the AoA of the second-frequency-bin between (−100 and +100 kHz) will be the same as the AoA of the digital sideband in the inner-subset of the first-frequency-bin (between −200 and −100 kHz).

if the inner-first-angle-difference-value ($|\varphi_u-\varphi_s|$) is greater than the predetermined proportion ($\alpha_u$) of the outer-first-angle-difference-value ($|\varphi_l-\varphi_s|$), then:

set first-weighting-values ($w_{opt,i}$) 816 as values for destructively combining the information that corresponds to the first-frequency-bins of the plurality of antenna-signals. This is based on the signal in the inner-subset of the first-frequency-bin (between −200 and −100 kHz) being closer, spatially, to the first interference signal in the first-frequency-bin than the desired digital sideband.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A receiver system comprising:
   an input terminal configured to receive input signalling comprising a plurality of antenna-signals, each received at a different antenna, wherein the plurality of antenna-signals each comprise information that corresponds to a first-frequency-bin and a second-frequency-bin;
   a first-AoA-block configured to determine a first-angle-of-arrival associated with the first-frequency-bin;
   a second-AoA-block configured to determine a second-angle-of-arrival associated with the second-frequency-bin;
   a first-weighting-determination-block configured to, based on the first-angle-of-arrival and the second-angle-of-arrival, either:
      set first-weighting-values as values for constructively combining the information that corresponds to the first-frequency-bins of the plurality of antenna-signals; or
      set first-weighting-values as values for destructively combining the information that corresponds to the first-frequency-bins of the plurality of antenna-signals;
   a first-weighting-application-block configured to apply the first-weighting-values to the information that corresponds to the first-frequency-bin in the plurality of antenna-signals in order to provide a weighted-first-frequency-bin-signal;

a second-weighting-determination-block configured to set second-weighting-values as values for constructively combining the information that corresponds to the second-frequency-bins of the plurality of antenna-signals;

a second-weighting-application-block configured to apply the second-weighting-values to the information that corresponds to the second-frequency-bin in the plurality of antenna-signals in order to provide a weighted-second-frequency-bin-signal;

a signal-combining-block configured to combine the weighted-first-frequency-bin-signal and the weighted-second-frequency-bin-signal in order to provide output-signalling.

2. The receiver system of claim 1, wherein:

the first-AoA-block comprises an outer-first-AoA-block configured to determine an outer-first-angle-of-arrival associated with an outer-subset of the first-frequency-bin;

the first-weighting-determination-block is configured to set the set first-weighting-values based on the outer-first-angle-of-arrival and the second-angle-of-arrival; and the first-weighting-application-block is configured to apply the first-weighting-values to the information that corresponds to the entire first-frequency-bin in the plurality of antenna-signals in order to provide the weighted-first-frequency-bin-signal.

3. The receiver system of claim 1, wherein:

the second-AoA-block comprises a middle-second-AoA-block configured to determine the second-angle-of-arrival based on a middle-subset of the second-frequency-bin; and the second-weighting-application-block is configured to apply the second-weighting-values to the information that corresponds to the entire second-frequency-bin in the plurality of antenna-signals in order to provide the weighted-second-frequency-bin-signal.

4. The receiver system of claim 1, wherein the first-weighting-determination-block is configured to set first-weighting-values based on whether or not a difference between the first-angle-of-arrival and the second-angle-of-arrival satisfies an outer-threshold-value.

5. The receiver system of claim 1, wherein:

the first-weighting-values comprise a plurality of first-antenna-weighting-values, one for each of the plurality of antenna-signals;

the second-weighting-values comprise a plurality of second-antenna-weighting-values, one for each of the plurality of antenna-signals.

6. The receiver system of claim 5, wherein the first-weighting-application-block is configured to:

multiply each of the first-antenna-weighting-values by the information that corresponds to the first-frequency-bin of an associated one of the plurality of antenna-signals in order to provide a plurality of first-antenna-weighted-signals; and add the plurality of first-antenna-weighted-signals together in order to provide the weighted-first-frequency-bin-signal.

7. The receiver system of claim 5, wherein the second-weighting-application-block is configured to:

multiply each of the second-antenna-weighting-values by the information that corresponds to the second-frequency-bin of an associated one of the plurality of antenna-signals in order to provide a plurality of second-antenna-weighted-signals; and add the plurality of second-antenna-weighted-signals together to provide the weighted-second-frequency-bin-signal.

8. The receiver system of claim 1, wherein the first-weighting-determination-block is configured to set the first-weighting-values based on the second-weighting-values for constructively combining the information that corresponds to the first-frequency-bins of the plurality of antenna-signals.

9. The receiver system of claim 8, wherein the first-weighting-determination-block is configured to:

determine adjusted-second-weighting-values by modifying the second-weighting-values based on a spatial covariance matrix of the information in the plurality of antenna-signals that corresponds to the first-frequency-bin; and set the first-weighting-values as the adjusted-second-weighting-values.

10. The receiver system of claim 1, wherein the plurality of antenna-signals also each comprise information that corresponds to a third-frequency-bin, the receiver system further comprising:

a third-AoA-block configured to determine a third-angle-of-arrival associated with the third-frequency-bin;

a third-weighting-determination-block configured to, based on the third-angle-of-arrival and the second-angle-of-arrival, either:

set third-weighting-values as values for constructively combining the information that corresponds to the third-frequency-bins of the plurality of antenna-signals; or set third-weighting-values as values for destructively combining the information that corresponds to the third-frequency-bins of the plurality of antenna-signals;

a third-weighting-application-block configured to apply the third-weighting-values to the information that corresponds to the third-frequency-bin in the plurality of antenna-signals in order to provide a weighted-third-frequency-bin-signal; and wherein the signal-combining-block is configured to combine the weighted-first-frequency-bin-signal, the weighted-second-frequency-bin-signal and the weighted-third-frequency-bin-signal in order to provide the output-signalling.

11. The receiver system of claim 10, wherein the third-AoA-block comprises:

an inner-third-AoA-block configured to determine an inner-third-angle-of-arrival associated with an inner-subset of the third-frequency-bin;

an outer-third-AoA-block configured to determine an outer-third-angle-of-arrival associated with an outer-subset of the third-frequency-bin;

wherein the third-weighting-determination-block is configured to:

determine an outer-third-angle-difference-value as the difference between the outer-third-angle-of-arrival and the second-angle-of-arrival;

if the outer-third-angle-difference-value is less than an outer-threshold-value, then:

set third-weighting-values as values for constructively combining the information that corresponds to the third-frequency-bins of the plurality of antenna-signals;

determine an inner-third-angle-difference-value as the difference between the inner-third-angle-of-arrival and the second-angle-of-arrival;

if the inner-third-angle-difference-value is less than a predetermined proportion of the outer-third-angle-difference-value, then set third-weighting-values as values for constructively combining the information that corresponds to the third-frequency-bins of the plurality of antenna-signals;

if the inner-third-angle-difference-value is greater than the predetermined proportion of the outer-third-angle-difference-value, then set third-weighting-values as values for destructively combining the information that corresponds to the third-frequency-bins of the plurality of antenna-signals.

12. The receiver system of claim 11, wherein the third-weighting-application-block is configured to apply the third-weighting-values to the information that corresponds to the entire third-frequency-bin in the plurality of antenna-signals in order to provide the weighted-third-frequency-bin-signal.

13. The receiver system claim 1, wherein the first-AoA-block comprises:

an inner-first-AoA-block configured to determine an inner-first-angle-of-arrival associated with an inner-subset of the first-frequency-bin;

an outer-first-AoA-block configured to determine an outer-first-angle-of-arrival associated with an outer-subset of the first-frequency-bin;

wherein the first-weighting-determination-block is configured to:

determine an outer-first-angle-difference-value as the difference between the outer-first-angle-of-arrival and the second-angle-of-arrival;

if the outer-first-angle-difference-value is less than an outer-threshold-value, then:

set first-weighting-values as values for constructively combining the information that corresponds to the first-frequency-bins of the plurality of antenna-signals;

determine an inner-first-angle-difference-value as the difference between the inner-first-angle-of-arrival and the second-angle-of-arrival;

if the inner-first-angle-difference-value is less than a predetermined proportion of the outer-first-angle-difference-value, then set first-weighting-values as values for constructively combining the information that corresponds to the first-frequency-bins of the plurality of antenna-signals;

if the inner-first-angle-difference-value is greater than the predetermined proportion of the outer-first-angle-difference-value, then set first-weighting-values as values for destructively combining the information that corresponds to the first-frequency-bins of the plurality of antenna-signals.

14. The receiver system of claim 13, wherein the first-weighting-application-block is configured to apply the first-weighting-values to the information that corresponds to the entire first-frequency-bin in the plurality of antenna-signals in order to provide the weighted-first-frequency-bin-signal.

15. The receiver system of claim 13, wherein the second-weighting-application-block is configured to apply the second-weighting-values to the information that corresponds to the entire second-frequency-bin in the plurality of antenna-signals in order to provide a weighted-second-frequency-bin-signal.

* * * * *